(12) United States Patent  
Kent et al.

(10) Patent No.: US 8,854,339 B2
(45) Date of Patent: Oct. 7, 2014

(54) ACOUSTIC TOUCH SENSOR

(75) Inventors: Joel C. Kent, Fremont, CA (US); James L. Aroyan, Santa Cruz, CA (US)

(73) Assignee: Elo Touch Solutions, Inc., Menlo Park, CA (US)

( * ) Notice: Subject to any disclaimer, the term of this patent is extended or adjusted under 35 U.S.C. 154(b) by 0 days.

(21) Appl. No.: 13/184,435

(22) Filed: Jul. 15, 2011

(65) Prior Publication Data

US 2012/0007837 A1 Jan. 12, 2012

Related U.S. Application Data

(63) Continuation of application No. 11/106,394, filed on Apr. 13, 2005.

(60) Provisional application No. 60/562,461, filed on Apr. 14, 2004, provisional application No. 60/562,455, filed on Apr. 14, 2004.

(51) Int. Cl.
G06F 3/043 (2006.01)

(52) U.S. Cl.
CPC .................................. *G06F 3/0436* (2013.01)
USPC ....................................................... 345/177

(58) Field of Classification Search
CPC ..... G06F 3/043; G06F 3/0433; G06F 3/0436; G06F 3/016
USPC .................................................. 345/173, 177
See application file for complete search history.

(56) References Cited

U.S. PATENT DOCUMENTS

| 3,673,327 A | 6/1972 | Johnson et al. |
| 3,883,831 A | 5/1975 | Williamson et al. |
| 3,974,464 A | 8/1976 | Wagers et al. |
| 4,492,949 A | 1/1985 | Peterson et al. |
| 4,564,928 A | 1/1986 | Glenn et al. |
| 4,634,917 A | 1/1987 | Dvorsky et al. |
| 4,642,423 A | 2/1987 | Adler |
| 4,644,100 A | 2/1987 | Brenner et al. |
| 4,645,870 A | 2/1987 | Adler |
| 4,700,176 A | 10/1987 | Adler |

(Continued)

FOREIGN PATENT DOCUMENTS

| EP | 1107102 A1 | 6/2001 |
| EP | 1 260 937 A2 | 11/2002 |

(Continued)

OTHER PUBLICATIONS

B.A. Auld, *Acoustic Fields and Waves in Solids*, vol. II, 2nd ed., Krieger Publishing Company, 1990, pp. 163-169.

(Continued)

*Primary Examiner* — Dwayne Bost
*Assistant Examiner* — Christopher Kohlman
(74) *Attorney, Agent, or Firm* — Alston & Bird LLP

(57) ABSTRACT

A touch sensor comprises a substrate capable of propagating acoustic waves and includes a first surface having a touch sensitive region. A first sidewall intersects the first surface along a first edge. The first edge is configured to propagate a first acoustic wave along the first edge. The first acoustic wave may be a one-dimensional edge wave. A wave converter converts the first acoustic wave to a second acoustic wave, and the first surface is configured to propagate the second acoustic wave across the touch sensitive region.

16 Claims, 21 Drawing Sheets

(56) References Cited

U.S. PATENT DOCUMENTS

| | | | |
|---|---|---|---|
| 4,746,914 A | 5/1988 | Adler |
| 4,791,416 A | 12/1988 | Adler |
| 4,825,212 A | 4/1989 | Adler et al. |
| 4,849,996 A | 7/1989 | Kamerman |
| 4,880,665 A | 11/1989 | Adler et al. |
| RE33,151 E | 1/1990 | Adler |
| 5,072,427 A | 12/1991 | Knowles |
| 5,162,618 A | 11/1992 | Knowles |
| 5,177,327 A | 1/1993 | Knowles |
| 5,243,148 A | 9/1993 | Knowles |
| 5,260,521 A | 11/1993 | Knowles |
| 5,329,070 A | 7/1994 | Knowles |
| 5,451,723 A | 9/1995 | Huang et al. |
| 5,573,077 A * | 11/1996 | Knowles ................. 178/18.04 |
| 5,591,945 A | 1/1997 | Kent |
| 5,648,643 A | 7/1997 | Knowles et al. |
| 5,708,461 A | 1/1998 | Kent |
| 5,717,434 A | 2/1998 | Toda |
| 5,723,934 A | 3/1998 | Toda |
| 5,739,479 A | 4/1998 | Davis-Cannon et al. |
| 5,760,523 A | 6/1998 | Toda |
| 5,767,604 A | 6/1998 | Toda |
| 5,767,608 A | 6/1998 | Toda |
| 5,771,206 A | 6/1998 | Toda |
| 5,798,597 A | 8/1998 | Toda |
| 5,838,088 A | 11/1998 | Toda |
| 5,850,118 A | 12/1998 | Toda |
| 5,852,261 A | 12/1998 | Toda |
| 5,852,433 A | 12/1998 | Toda |
| 5,854,450 A | 12/1998 | Kent |
| 5,874,869 A | 2/1999 | Ueda et al. |
| 5,883,457 A | 3/1999 | Rinde et al. |
| 5,886,452 A | 3/1999 | Toda |
| 5,986,224 A | 11/1999 | Kent |
| 5,994,817 A | 11/1999 | Toda |
| 6,004,474 A | 12/1999 | Takenaka et al. |
| 6,005,327 A | 12/1999 | Toda |
| 6,060,812 A | 5/2000 | Toda |
| 6,087,599 A | 7/2000 | Knowles |
| 6,091,406 A | 7/2000 | Kambara et al. |
| 6,194,809 B1 | 2/2001 | Takeuchi et al. |
| 6,235,801 B1 | 5/2001 | Morales et al. |
| 6,236,391 B1 | 5/2001 | Kent et al. |
| 6,254,105 B1 | 7/2001 | Rinde et al. |
| 6,258,291 B1 | 7/2001 | Kimura et al. |
| 6,313,829 B1 | 11/2001 | Tolt et al. |
| 6,366,277 B1 | 4/2002 | Armstrong |
| 6,392,167 B1 | 5/2002 | Nakagawa |
| 6,396,484 B1 | 5/2002 | Adler et al. |
| 6,411,287 B1 | 6/2002 | Scharff et al. |
| 6,441,559 B1 | 8/2002 | Yamamoto et al. |
| 6,441,809 B2 | 8/2002 | Kent et al. |
| 6,473,075 B1 | 10/2002 | Gomes et al. |
| 6,503,831 B2 | 1/2003 | Speakman et al. |
| 6,512,323 B2 | 1/2003 | Forck et al. |
| 6,593,917 B2 | 7/2003 | Toda |
| 6,630,929 B1 | 10/2003 | Adler et al. |
| 6,636,201 B1 | 10/2003 | Gomes et al. |
| 6,723,929 B2 | 4/2004 | Kent |
| 6,750,853 B2 | 6/2004 | Takahashi et al. |
| 6,756,973 B2 | 6/2004 | Sano et al. |
| 6,759,928 B2 | 7/2004 | Endou et al. |
| 6,911,973 B2 | 6/2005 | Katsuki et al. |
| 6,965,680 B2 | 11/2005 | Yamauchi et al. |
| 7,030,860 B1 | 4/2006 | Hsu et al. |
| 7,116,315 B2 | 10/2006 | Sharp et al. |
| 7,167,570 B2 | 1/2007 | Kobayashi |
| 7,187,369 B1 | 3/2007 | Kanbara et al. |
| 7,193,617 B1 | 3/2007 | Kanbara et al. |
| 7,545,365 B2 | 6/2009 | Kent et al. |
| 2001/0054305 A1 | 12/2001 | Banda et al. |
| 2002/0005838 A1 | 1/2002 | Inoue et al. |
| 2002/0075242 A1 | 6/2002 | Toda |
| 2002/0101408 A1 | 8/2002 | Sano et al. |
| 2002/0104691 A1 | 8/2002 | Kent et al. |
| 2002/0171635 A1 | 11/2002 | Takahashi et al. |
| 2003/0019669 A1 | 1/2003 | Toda |
| 2003/0164820 A1 | 9/2003 | Kent |
| 2004/0263490 A1 | 12/2004 | Kent et al. |
| 2005/0073505 A1 | 4/2005 | Katsuki et al. |
| 2005/0134574 A1 * | 6/2005 | Hill ............................. 345/173 |
| 2005/0146513 A1 | 7/2005 | Hill et al. |
| 2005/0190161 A1 | 9/2005 | Hong et al. |
| 2005/0243071 A1 | 11/2005 | Kent et al. |

FOREIGN PATENT DOCUMENTS

| | | |
|---|---|---|
| JP | 6-348395 A | 12/1994 |
| JP | 8-305482 A | 11/1996 |
| JP | 10-211705 A | 8/1998 |
| JP | 2001-014094 | 1/2001 |
| JP | 2001-111133 | 4/2001 |
| JP | 2002-041232 | 2/2002 |
| JP | 2002-222041 | 8/2002 |
| JP | 2002-342032 | 11/2002 |
| WO | WO84/00427 A1 | 2/1984 |
| WO | WO 98/07127 A1 | 2/1998 |
| WO | WO 98/29853 A | 7/1998 |
| WO | WO01/02944 | 1/2001 |
| WO | WO 01/93189 A2 | 12/2001 |
| WO | WO 03044768 A1 | 5/2003 |

OTHER PUBLICATIONS

M. de Billy, "Acoustic Technique Applied to the Measurement of the Free Edge Wave Velocity", *Ultrasonics*, IPC Science and Technology Press, Ltd., vol. 34, No. 6, Aug. 1996, pp. 611-619.

P. Lagasse et al., IEEE Transactions on Sonics and Ultrasonics, vol. SU-20(2), Apr. 1973, pp. 143-154.

Adler, Robert. et al; "Unusual Parametric Effects on Line Acoustic Waves", IEEE Transactions on Sonics and Ultrasonics, vol. 26, No. 5, Sep. 1979, pp. 345-347.

Arthur A. Oliner "Waveguides for Acoustic Surface Waves: A Review", Proceedings of the IEEE, vol. 64, No. 5, May 1976, pp. 615-627.

International Search Report for International Application No. PCT/US2005/012896, mailed Dec. 16, 2005.

International Search Report for International Appl. No. PCT/US2005/012891, mailed Feb. 9, 2006.

Norris, A. N., "Flexural Waves on Narrow Plates," *Journal of the Acoustical Society of America*, vol. 113, No. 5, May 2003, pp. 2647-2657 retrieved on Dec. 11, 2012 from : <rci.rutgers.edu/~norris/papers/2003_JASA_113(5)_2647-2658.pdf>.

Office Action from corresponding Japanese Patent Appl. No. JP2007-508575, dated Nov. 2, 2010.

Search Report for United Kingdom Patent Appl. No. GB0816653.0, mailed Sep. 29, 2008.

European Search Report and Opinion for European Application No. 11176490.8, Sep. 22, 2011.

European Search Report and Opinion for European Application No. 11176433.8, Sep. 16, 2011.

European Search Report and Opinion for European Application No. 11176467.6, Sep. 13, 2011.

"Wave Propagation" discussion from NDT (Non-Destructive Testing) Resource Center, http://www.ndt-ed.org/EducationResources/CommunityCollege/Ultrasonics/Physics/wavepropagation.htm (web snapshot from Dec. 9, 2003).

Extended search report and written opinion for European Application No. 11176433.8-1527, Sep. 16, 2011.

\* cited by examiner

ACOUSTIC TOUCH SENSOR

CROSS-REFERENCE TO RELATED APPLICATIONS

This application is a continuation of U.S. patent application Ser. No. 11/106,394 filed on Apr. 13, 2005, which claimed priority from U.S. Provisional Patent Application Ser. No. 60/562,461, entitled "Acoustic Touch Sensor," filed Apr. 14, 2004, and U.S. Provisional Patent Application Ser. No. 60/562,455, entitled "Acoustic Touch Sensor," filed Apr. 14, 2004, the disclosures of which are incorporated herein by reference.

BACKGROUND OF THE INVENTION

1. Field of the Invention

This invention relates to touch sensors, in particular to acoustic touch sensors and acoustic touchscreens having narrow functional borders and increased touch-sensitive areas.

2. Introduction to the Invention

An acoustic touch sensor has a touch sensitive area on which the presence and location of a touch is sensed by the touch's effect on the transmission of acoustic waves across a touch sensor substrate. Acoustic touch sensors may employ Rayleigh waves (including quasi-Rayleigh waves), Lamb or shear waves, or a combination of different types of the acoustic waves.

FIG. 1 illustrates the operation of a conventional acoustic touch sensor, an acoustic touchscreen 1. The touchscreen 1 has a touch-sensitive area 2 inside of which two-dimensional coordinates of touches are determined. For example, the touch-sensitive area 2 may include the region bounded by the dashed line 16 which represents the inner boundary of a bezel 10. A first transmitting transducer 3a is positioned outside of touch-sensitive area 2 and is acoustically coupled to the surface of touchscreen 1. The transducer 3a sends an acoustic signal in the form of an acoustic wave 11a traveling parallel to the top edge of touchscreen 1 and generally in the plane of touchscreen 1. Aligned in the transmission path of acoustic wave 11a is a first linear array 13a of partially acoustically reflective elements 4, each of which partially transmits the acoustic signals and partially reflects them (by an angle of approximately 90°), creating a plurality of acoustic waves (e.g., 5a, 5b and 5c) traveling vertically across touch-sensitive area 2. The spacing of reflective elements 4 is variable to compensate for the attenuation of the acoustic signals with increasing distance from first transmitter 3a. It is also well known even if reflective elements 4 are uniformly spaced, signal equalization may be achieved by varying the reflective strength of reflective elements 4. Acoustic waves 5a, 5b, and 5c are again reflected by an angle of approximately 90° (see arrow 11b) by a second linear array 13b of partially acoustically reflective elements 4 towards a first receiving transducer 6a upon reaching the lower edge of touchscreen 1. At the receiving transducer 6a, the waves are detected and converted to electrical signals for data processing. Similar arrangements of reflective elements are located along the left and right edges of touchscreen 1. A second transmitting transducer 3b generates an acoustic wave 12a along the left edge, and a third linear array 13c of partially acoustically reflective elements 4 creates a plurality of acoustic waves (e.g., 7a, 7b, and 7c) traveling horizontally across touch-sensitive area 2. Acoustic waves 7a, 7b, and 7c are redirected along 12b by a fourth linear array 13d of partially acoustically reflective elements 4 towards receiving transducer 6b, where they are detected and converted to electrical signals for data processing.

If touch-sensitive area 2 is touched at position 8 by an object such as a finger or stylus, a portion of the energy of the acoustic waves 5b and 7a is absorbed by the touching object. The resulting attenuation is detected by receiving transducers 6a and 6b as a perturbation in the acoustic signal. A time delay analysis of the data with the aid of a microprocessor (not shown) allows determination of the coordinates of touch position 8. The device of FIG. 1 can also function as a touchscreen with only two transducers using a transmit/receive transducer scheme.

A housing 9, indicated by dashed lines in FIG. 1, may be associated with touchscreen 1. The housing can be made of any suitable material, for example molded polymer or sheet metal. The housing 9 includes a bezel 10, indicated by dashed line 16 representing an inner boundary of bezel 10 and dashed line 17 indicating an outer boundary of bezel 10 in FIG. 1. The inner dashed line 16 shows that the housing 9 overlays a periphery of touchscreen 1, concealing the transmitting and receiving transducers, the reflective elements, and other components, but exposing touch-sensitive area 2. This arrangement can protect the concealed components from contamination and/or damage, provide an aesthetic appearance, and define the touch-sensitive area for the user.

A touchscreen may comprise a separate faceplate overlaid on a display panel. The faceplate is typically made of glass, but any other suitable substrate may be used. The display panel may be a cathode ray tube (CRT), a liquid crystal display (LCD), plasma, electroluminescent, organic light-emitting-diode (OLED) display, or any other type of display.

As shown in FIG. 1, the touch sensitive area 2 is surrounded by border regions 15 where the reflective elements 4 and the transmitting and receiving transducers 3a, 3b, 6a and 6b are located. Reducing the width of border regions 15 increases the touch sensitive area 2. For touch sensor applications using transparent touch sensors such as touchscreens, the width of the border can be especially important. A touch sensor with narrowed border regions 15 can be integrated into display monitors that themselves have a narrow border around the displayed image. This feature is desirable as the general market trend for devices such as monitors is towards sleeker and more mechanically compact designs. A touch sensor with narrowed border regions 15 also is more easily sealed as well as being lighter and can have increased sensor area. Amongst competing touchscreen technologies, (e.g., acoustic, capacitive, resistive and infrared) acoustic touchscreens tend to have wider borders.

It is possible to reduce the border region of a touchscreen by using a waveguide to concentrate an acoustic wave in the border region, as disclosed in U.S. Pat. No. 6,636,201, the disclosure of which is incorporated herein by reference. However, alternate solutions may be desired which do not require providing a waveguide on the touch surface of the touch sensor substrate.

For the reasons outlined above, it is desirable to have acoustic touch sensor designs capable of accommodating a very narrow border region.

BRIEF SUMMARY OF THE INVENTION

In one embodiment, a touch sensor comprises a substrate. The substrate is capable of propagating acoustic waves and includes a first surface having a touch sensitive region. A first sidewall intersects the first surface along a first edge. The first edge is configured to propagate a first acoustic wave along the first edge, and the first surface is configured to propagate a second acoustic wave across the touch sensitive region. A wave converter converts the first acoustic wave to the second acoustic wave, and the second acoustic wave is based on the first acoustic wave. Optionally, the wave converter may be a reflective array that coherently scatters and mode converts the first acoustic wave into the second acoustic wave.

In another embodiment, a touch sensor system comprises a transmitter for generating a one-dimensional first acoustic wave. A touch sensor comprises a substrate capable of propagating acoustic waves. The substrate includes a first surface having a touch sensitive region. First and second sidewalls intersect the first surface along first and second edges. The first edge is configured to propagate the first acoustic wave and the first surface is configured to propagate a second acoustic wave across the touch sensitive region. A first converter is provided on the substrate for converting the first acoustic wave to the second acoustic wave. A detector is provided on the substrate for detecting the second acoustic wave after traversing at least a portion of the touch sensitive region. Such detection of the second acoustic wave may be direct or indirect.

In another embodiment, a method is provided for detecting a touch on a touch sensitive region of a substrate capable of propagating acoustic waves. The substrate includes a first surface having the touch sensitive region. First and second sidewalls of the substrate intersect the first surface along first and second edges. The method comprises transmitting a one-dimensional first acoustic wave along the first sidewall. The first acoustic wave is converted into a second acoustic wave. The second acoustic wave is directed along the first surface through the touch sensitive region. The second acoustic wave is detected proximate the second sidewall of the substrate. Such detection of the second acoustic wave may be direct or indirect.

In another embodiment, a touch sensor comprises a substrate capable of propagating acoustic waves. The substrate includes a first surface having a touch sensitive region and a first sidewall intersecting the first surface along a first edge. The first edge is configured to propagate a first acoustic wave along the first edge, and the first surface is configured to propagate a second acoustic wave across the touch sensitive region. The second acoustic wave is based on the first acoustic wave. The touch sensor further comprises a reflective array having reflector elements formed on the substrate for mode conversion between the first and second acoustic waves. The first edge may form a curved region. The touch sensitive region has a surface being one of flat, curved and hemispherical. The substrate may further comprise four sidewalls intersecting the first surface along four edges, and form corners with adjacent sidewalls. A transducer is mounted at each corner for producing or receiving an acoustic wave, and a reflective array is mounted proximate each of the four edges. At least two transducers may be mounted to the substrate and used to produce or receive acoustic waves. The touch sensitive region receives touch events having two coordinates which identify a location of a touch event. First and second transducers may be mounted to the substrate to produce and receive acoustic waves for detecting first and second coordinates, respectively, of the touch event on the touch sensitive region. Optionally, at least two transducers may be mounted to the substrate, wherein at least one of the transducers is used to produce and receive acoustic waves to detect a coordinate of the touch event. Transducers are mounted to the substrate for producing and receiving acoustic waves over one of an entire or a portion of the touch sensitive region. In another embodiment, a second sidewall, formed substantially free of defects, intersects the first surface along a second edge. The second edge forms an approximate 90° angle between the second sidewall and the first surface, and the second edge reflects the second acoustic wave after traversing at least a portion of the touch sensitive region. Alternatively, one or more reflective strips are formed proximate the second edge and are spaced apart from each other by an integer times one-half wavelength of the second acoustic wave. The reflective strips and the second edge reflect the second acoustic wave after traversing at least a portion of the touch sensitive region.

In another embodiment, a touch sensor comprises a substrate capable of propagating acoustic waves. The substrate includes a first surface having a touch sensitive region and a first sidewall intersecting the first surface along a first edge. The first edge is configured to propagate a first acoustic wave along the first edge, and the first surface is configured to propagate a second acoustic wave across the touch sensitive region. The second acoustic wave is based on the first acoustic wave. A reflective array comprising partially reflective elements is formed on the substrate proximate the first edge for mode conversion between the first and second acoustic waves. The partially reflective elements may be formed by adding material to the substrate to form protrusions or removing material from the substrate to form grooves. Alternatively, a first portion of the partially reflective elements may be formed by adding material to the substrate and a second portion may be formed by removing material from the substrate. The partially reflective elements are formed regularly spaced with respect to each other, and may extend along at least one of the first sidewall and the first surface. Additionally, the partially reflective elements may have a length from the first edge of less than a wavelength of the first acoustic wave. A first set of regularly spaced partially reflective elements have a relatively strong Fourier component with respect to a period of one wavelength of the first acoustic wave and simultaneously a minimum Fourier component with respect to a period of one-half wavelength of the first acoustic wave. Alternatively, the reflective array may be formed of first and second sets of regularly spaced partially reflective elements, wherein the second set is shifted with respect to the first set by one-quarter wavelength of the first acoustic wave, and the first and second sets are superposed on one another. The partially reflective elements may be formed having a width along the first edge of approximately one-half wavelength of the first acoustic wave.

In another embodiment, a touch sensor comprises a substrate capable of propagating acoustic waves. The substrate includes a first surface having a touch sensitive region and a first sidewall intersecting the first surface along a first edge. The first edge is configured to propagate a first acoustic wave along the first edge, and the first surface is configured to propagate a second acoustic wave across the touch sensitive region. The second acoustic wave is based on the first acoustic wave. The touch sensor further comprises a transducer for generating and receiving acoustic waves which comprises a piezoelectric element, and a reflective array for mode conversion between the first and second acoustic waves. The transducer may comprise a diffractive grating positioned along the first edge, a diffractive grating formed on the first sidewall proximate the first edge, or a diffractive grating formed on the first surface proximate the first edge. The diffractive grating may comprise a series of grooves being spaced apart by approximately one wavelength of the first acoustic wave. Optionally, the diffractive grating comprises a series of grooves formed in the substrate which are spaced apart by approximately one wavelength of the first acoustic wave. Alternatively, the diffractive grating comprises a series of grooves formed in the piezoelectric element. The piezoelectric element may be one of a pressure-mode piezo and a shear-mode piezo. The transducer may further comprise a wedge element bonded to the piezoelectric element. The wedge element is mounted on one of the first sidewall and the first surface, and a grating is positioned on the first edge proximate the wedge element. Alternatively, the wedge element may be mounted on the first sidewall and form an acute angle with respect to a plane parallel to the first surface, and a grating comprising regularly spaced grooves in the substrate is formed on the first edge proximate the wedge element. Optionally, an angled recess may be formed by removing material from the substrate, and wedge element, bonded to the piezoelectric element, is mounted within the angled recess. In another embodiment, the transducer is mounted on a second sidewall which intersects the first surface along a second edge, the second sidewall forming a plane perpendicular to the propagation direction of the first acoustic wave. The piezoelectric element of the transducer mounted on the second sidewall may be a shear-mode piezo. Optionally, the shear-mode piezo may have a poling direction of approximately 45° with respect to the touch surface. In another embodiment, the piezoelectric element further comprises front and back sides. First and second electrodes may be applied to cover one of a portion and substantially all of the front and back sides of the piezoelectric element, forming an active region corresponding to an area of the piezoelectric element where the first and second electrodes overlap. Alternatively, the transducer is bonded to the substrate wherein the bonding corresponds to a portion of the active region and provides strong acoustic coupling to the substrate and the transducer in an area less than one-wavelength squared of the first acoustic wave. Optionally, the first electrode is applied to cover at least a portion of the front side and a second electrode is applied to cover at least a portion of the front and back sides, wherein first and second electrodes on the front side receive attachments to first and second electrical connections for exciting the piezoelectric element. The piezoelectric element further comprises a second edge intersecting each of the front and back sides. The second edge is adjacent to the first edge and occupies a plane perpendicular to the first edge. One of the front and back sides is formed to mount to the substrate and the piezoelectric element is poled in a direction perpendicular to a plane parallel to the front and back sides. First and second electrodes are formed on the first and second edges, and the first and second electrodes receive attachments to first and second electrical contacts for exciting the piezoelectric element. In another embodiment, the piezoelectric element is mounted to the substrate having a portion of the piezoelectric element extend beyond at least one of the first surface and the sidewall. Alternatively, the portion of the piezoelectric element extending beyond at least one of the first surface and the sidewall extends a distance of less than one wavelength of the first acoustic wave.

BRIEF DESCRIPTION OF THE DRAWINGS

The foregoing summary, as well as the following detailed description of certain embodiments of the present invention, will be better understood when read in conjunction with the appended drawings. It should be understood that the present invention is not limited to the arrangements and instrumentality shown in the attached drawings.

DETAILED DESCRIPTION OF THE INVENTION

Figure 1:
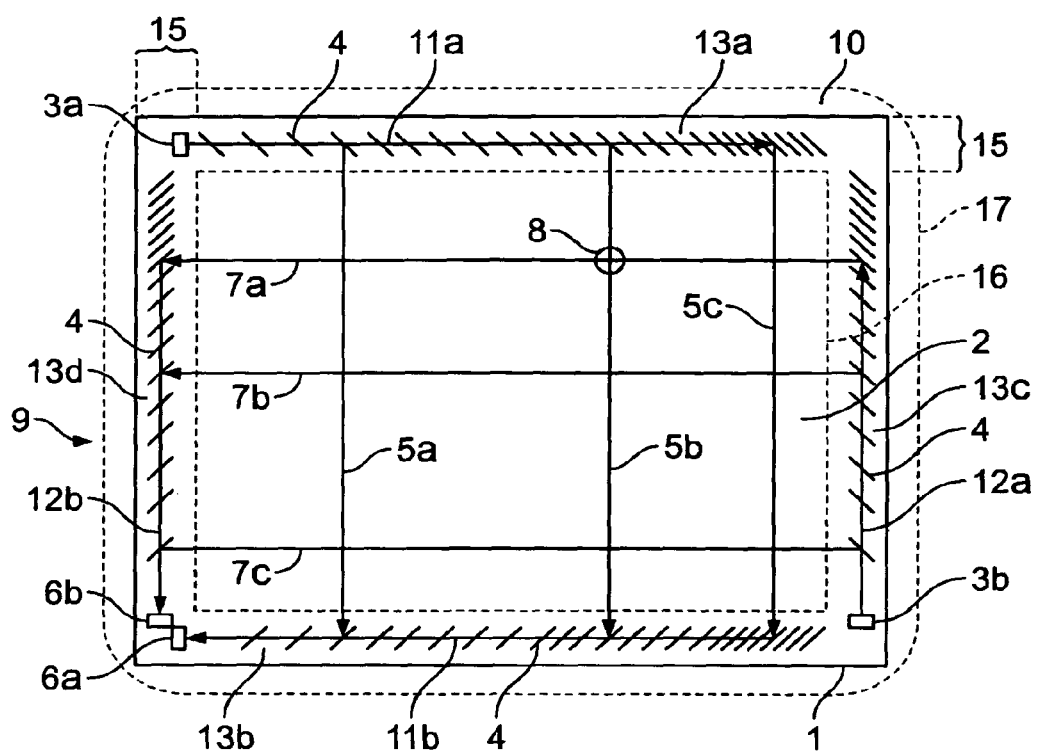
FIG. 1 illustrates the operation of a conventional acoustic touch sensor, an acoustic touchscreen.

Conventional reflective arrays 13a-13d as shown in FIG. 1 range in width between about 5 mm and 15 mm, which corresponds to a range of about 9-26 acoustic wavelengths (assuming a conventional frequency of about 5 MHz, corresponding to a wavelength of about 0.57 mm). The reflective arrays having narrower widths are typically used on smaller screens.

Acoustic surface waves concentrate acoustic energy near a two-dimensional surface. The surface can be described as guiding the waves, as the acoustic surface waves propagate near the surface without diffusing away from the surface if the surface is flat or even if the surface has a slight curvature. One-dimensional edge acoustic waves are a type of acoustic wave. One-dimensional edge acoustic waves may be referred to as edge waves, flexural edge waves, or line acoustic waves. The wave energy of edge waves is localized about an edge of a surface and decays approximately exponentially in the directions normal to the edge. Therefore, the energy vector propagates along the edge. Edge waves are non-dispersive; their velocity is independent of frequency. Using non-dispersive waves in touch sensors is advantageous because propagation of acoustic waves will not distort touch-induced perturbations of received signals from their simple dip shape into more complex oscillatory shapes.

The majority of an edge wave's energy is within one wavelength of an approximate 90° corner defining the edge. Because of the exponential falloff in energy away from the edge, essentially no energy is found beyond two wavelengths of the edge. For edge waves having a frequency of about 5 MHz in glass, this means that an edge wave is confined to within about 1 mm of the edge. For a 2 mm thick glass plate, edge waves may propagate along the top edge of a sidewall without being affected by the presence of the bottom edge of the sidewall only 2 mm away. As the edge wave energy is confined to about 1 mm of the edge, it is possible to make a touch sensor with very narrow functional borders using edge wave technology. Therefore, a housing for a touch sensor incorporating edge waves can have a very narrow bezel region, and the touch sensitive area of the touch sensor can be increased.

Figure 2:
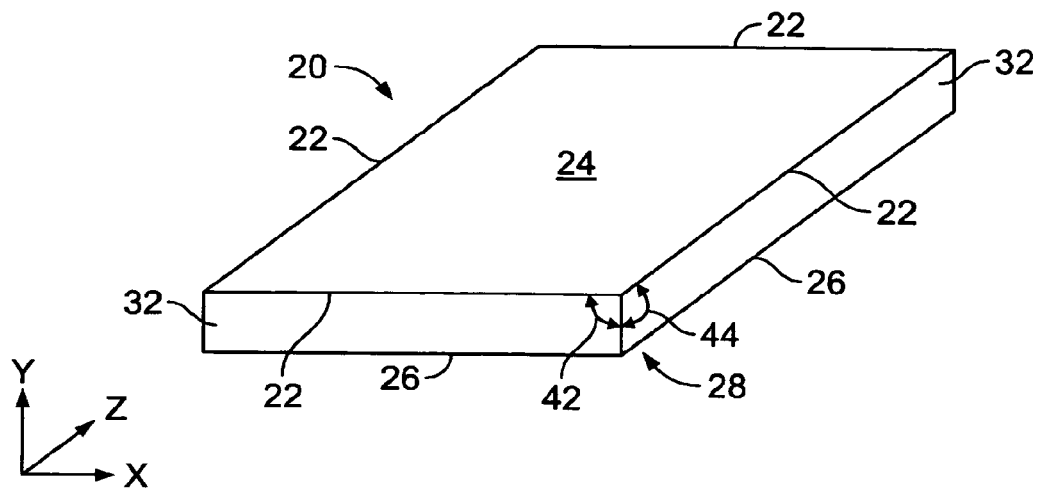
FIG. 2 illustrates a touch sensor substrate having a touch surface and sidewalls in accordance with an embodiment of the present invention.

FIG. 2 illustrates a touch sensor substrate 20 having a touch surface 24 and sidewalls 32 in accordance with an embodiment of the present invention. Any suitable material can be used for the substrate 20, including glass, ceramic, and metals (e.g., aluminum or steel). For some applications, low acoustic loss glass may be desired. For example, borosilicate glasses have low loss, and can provide increased received signal amplitudes that may in turn enable larger touch sensor areas.

Clean edges 22 are formed on the substrate 20 at an intersection between a plane corresponding to the touch surface 24 and planes corresponding to each of the sidewalls 32. The clean edges 22 are formed to be substantially free of defects, such that any deviations on the clean edge 22 such as chips, striations, dents, uneven regions, and the like have dimensions less than the acoustic wavelength. For a given frequency, the edge-wave wavelength is only a few percent shorter than the wavelength of the much better known Rayleigh wave. Therefore, making use of the Rayleigh wavelength as a well known and defined measurement, it may be noted that defects are preferably less than 20% of a Rayleigh wavelength.

The clean edges 22 may be formed by any method suitable for the material from which the substrate 20 is manufactured. For example, glass may be cut and machined to provide clean edges 22. Alternatively, the clean edge 22 may be formed by propagating a controlled fracture using thermal stress, for example by utilizing localized laser heating and gas jet cooling processes. Optionally, the glass may be scribed and broken which, if carefully done, can produce a clean edge 22 opposite the scribed surface.

Angles 42 and 44 formed where the sidewalls 32 abut the touch surface 24 are 90°, or within 20° of 90°, making sidewalls 32 vertical or substantially vertical with respect to the touch surface 24. By way of example only, for an edge 22 having an angle 42 or 44 much less than 90°, multiple edge wave modes with differing velocities can exist. However, if the edge 22 has an angle 42 or 44 within +/−10° of 90°, the edge 22 will support only a single edge wave mode. This is desirable as it eliminates the possibility of mode mixing as an edge wave propagates along the edge 22.

Opposing edges 26 are formed on the substrate 20 at an intersection between a plane corresponding to a second surface 28 of the substrate 20 and the planes corresponding to each of the sidewalls 32. The opposing edges 26 do not have to be clean, unless it is desired to also utilize the second surface 28 as a touch surface. If only one touch surface is desired, manufacturing time or cost can be minimized by only having to form clean edges adjacent to one surface.

Figure 30:
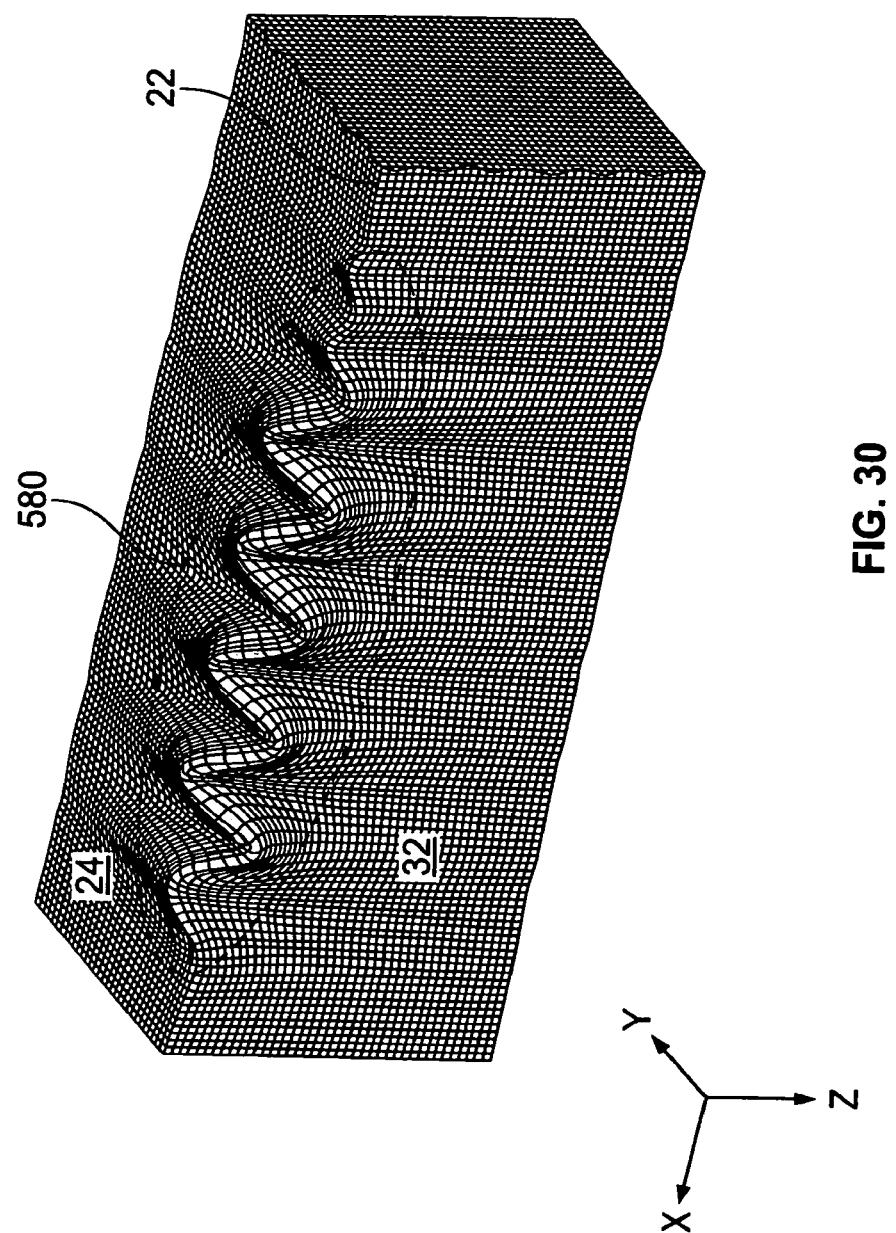
FIG. 30 illustrates an edge-wave packet propagating along an approximate 90° edge of the substrate in accordance with an embodiment of the present invention.

FIG. 30 illustrates an edge-wave packet 580 propagating along an approximate 90° edge 22 of the substrate 20 in accordance with an embodiment of the present invention. The edge wave propagates in the X direction, as indicated in FIG. 30. The dominant component of material motion (i.e. motion of atoms within the substrate 20) as the edge wave passes is perpendicular to the propagation direction X and at 45° with respect to both the Y and Z directions. Material deflections have been exaggerated in FIG. 30 for clarity. Note that the vast majority of the energy in the edge-wave packet 580 is contained within an edge-wave wavelength distance from the 90° edge 22 along the touch surface 24 and the sidewall 32.

Figure 3:
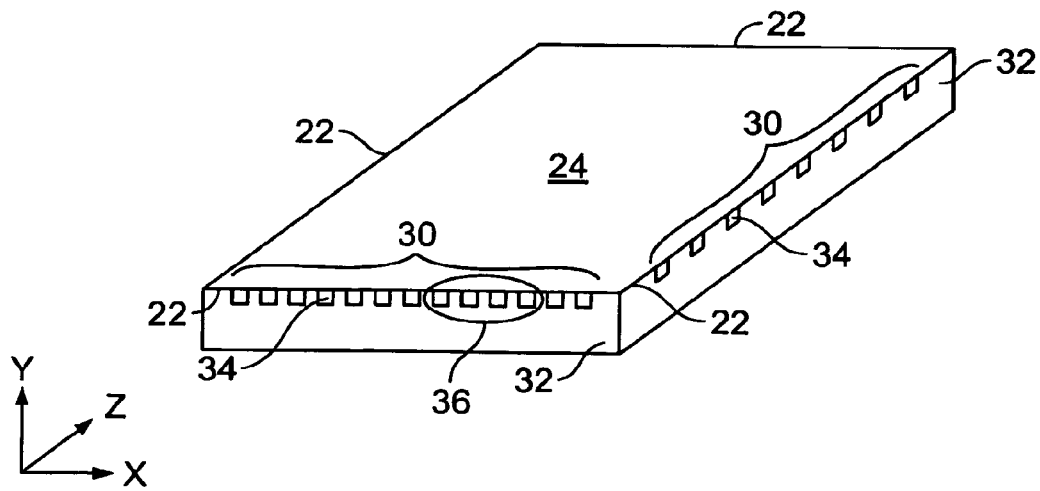
FIG. 3 illustrates partially reflective arrays formed to perturb edge waves propagating along the edges in accordance with an embodiment of the present invention.

FIG. 3 illustrates partially reflective arrays 30 formed to perturb edge waves propagating along the edges 22 in accordance with an embodiment of the present invention. Transducers (not shown) are used to convert between electrical signals and acoustic waves and will be discussed further below. For touch sensor systems, generally, electrical signals will be transmitted between a controller and a transducer to generate and/or receive acoustic signals.

The reflective arrays 30 comprise reflector elements 34 spaced proximate the clean edges 22 to perturb the edge waves propagating along the edges 22. A first wave, the one-dimensional edge wave, is generated and propagated along the edges 22 and within one wavelength of the edges 22. The reflective arrays 30 can be used to convert the edge waves to second acoustic waves, or two-dimensional surface acoustic waves (SAW), propagating across the touch surface 24 of the substrate 20. The reflective arrays 30 are reversible, and therefore can also be used to convert the second acoustic wave to a third acoustic wave, or a one-dimensional edge wave. The second acoustic wave can be any type of wave that will provide sufficient touch sensitivity over a two-dimensional touch surface, including surface bound waves like Rayleigh waves (where the term is meant to include quasi-Rayleigh waves) and plate waves (e.g., Lamb and shear waves). The reflector elements 34 in FIG. 3 are regularly (periodically) spaced apart along edges 22, and may extend along the sidewalls 32 of the substrate 20 along the Y axis (as shown in FIG. 3) and/or extend into the horizontal touch surface 24. As discussed below, the reflector elements 34 may be formed by either depositing material or removing a portion of the substrate 20.

As an edge wave travels along the edge 22 and encounters each of the reflector elements 34, the edge wave is partially transmitted to reach the next reflector element 34, partially absorbed or scattered by the reflector element 34, and partially converted by the reflector element 34 to Rayleigh waves bound to the surface 24 through 90° scattering and mode conversion between the one-dimensional edge wave and the two-dimensional Rayleigh surface acoustic wave (SAW).

Figure 4:
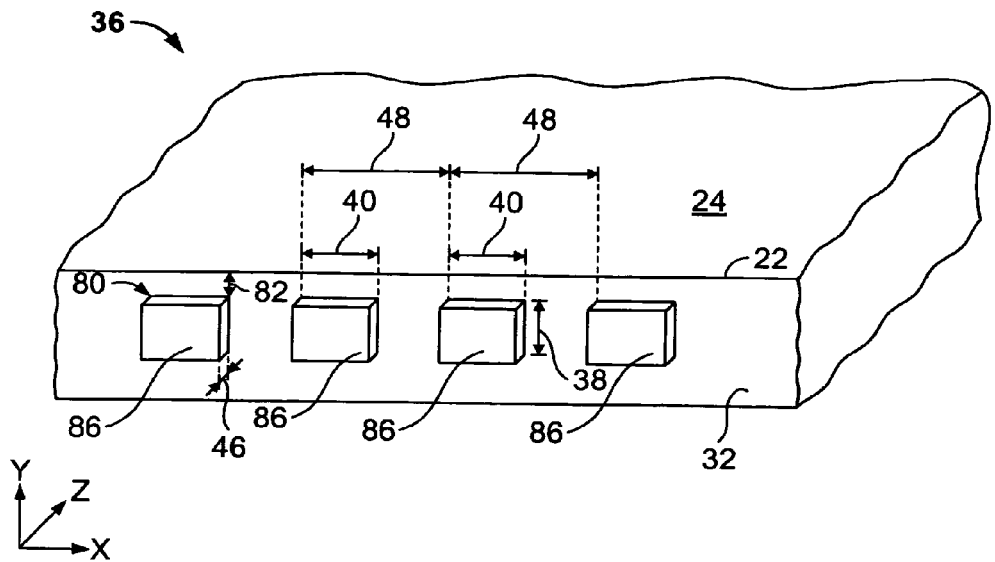
FIG. 4 illustrates an expanded view of a subset of the reflector elements in FIG. 3 in accordance with an embodiment of the present invention.

FIG. 4 illustrates an expanded view of a subset 36 of the reflector elements 34 in FIG. 3 in accordance with an embodiment of the present invention. The reflector elements 34 are illustrated as protruding reflector elements 86. The reflector elements 86 are periodically spaced apart by a distance 48 of approximately a wavelength of the edge waves ($\lambda_E$) traveling along the edge 22. Therefore, the surface Rayleigh waves launched by the mode conversion by the reflector elements 86 will be synchronous with each other. Many possible shapes are possible for reflector elements 86. As one specific example, the reflector elements 86 may be rectangular in shape, having a width 40 along the X axis of approximately $\lambda_E/2$, a height 38 along the Y axis of approximately $\lambda_E$ or less, and a depth 46 along the Z axis of much less than $\lambda_E$, such as less than a few percent of $\lambda_E$. By way of example, the depth 46 dimension of the reflector elements 86 extends outward from an outer surface of the sidewall 32 along the Z axis. A top edge 80 of the reflector elements 86 may be formed flush with the edge 22 or within a distance 82 of the edge 22.

The reflector elements 86 may be made of any suitable material. For example, fired on ceramics (e.g., glass frit) can be used. Alternatively, the reflector elements 86 may comprise a loaded-polymer UV-curable ink such as disclosed in U.S. Pat. No. 5,883,457, which is incorporated herein by reference. One example of a useful loaded-polymer UV-curable ink is one that is loaded with inorganic particles, and yet is soft compared to the substrate 20 due to its polymer matrix. Reflector elements 86 comprising such loaded polymer inks will induce only minor stiffness perturbations and will couple dominantly via mass loading or inertial effects. Therefore, reflector elements 86 may be fabricated that are mainly mass loading in nature. Reflector elements 86 may be formed on the substrate 20 by any suitable method, such as depositing by screen printing, pad printing, ink jet processes, micro-dispensing, and the like.

Figure 5:
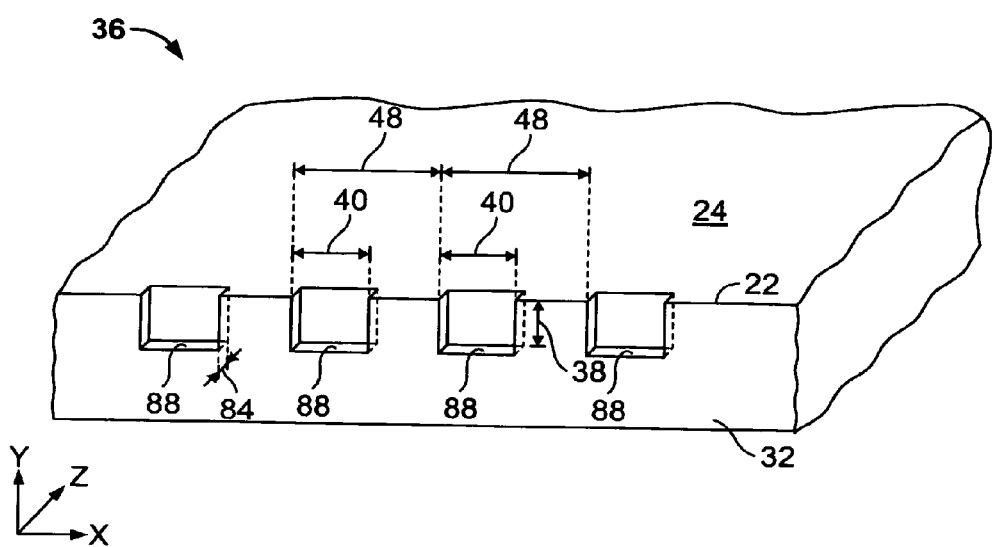
FIG. 5 illustrates an alternative expanded view of the subset of reflector elements in FIG. 3 in accordance with an embodiment of the present invention.

FIG. 5 illustrates an alternative expanded view of the subset 36 of reflector elements 34 in FIG. 3 in accordance with an embodiment of the present invention. In FIG. 5, the reflector elements 34 are illustrated as grooved reflector elements 88. The reflector elements 88 may be formed by removing small regions of the substrate 20 along the sidewalls 32 to form grooves or notches. As illustrated previously, the reflector elements 88 are periodically spaced apart by a distance 48 of approximately a wavelength of the edge wave ($\lambda_E$) traveling along the edge 22. Reflector elements 88 can have any of a wide variety of shapes, for example, the reflector elements 88 may be rectangular in shape, having a width 40 along the X axis of approximately $\lambda_E/2$, a height 38 along the Y axis of approximately $\lambda_E$ or less, and a depth 84 along the Z axis of much less than $\lambda_E$, such as less than a few percent of $\lambda_E$. The depth 84 dimension of the reflector elements 88 extends inward from the outer surface of the sidewall 32 along the Z axis.

Compared to protruding reflector elements 86 formed of material such as UV-curable inks as discussed with FIG. 4 which induce only minor stiffness perturbations and couple dominantly via mass loading or inertial effects, grooved reflector elements 88 couple to edge waves more as perturbations in substrate stiffness. Reflector elements 88 can be backfilled with other materials, such as a soft, loaded polymer, for example, to tune the mass-loading and stiffness-perturbation characteristics of the reflector elements 88.

Figure 6:
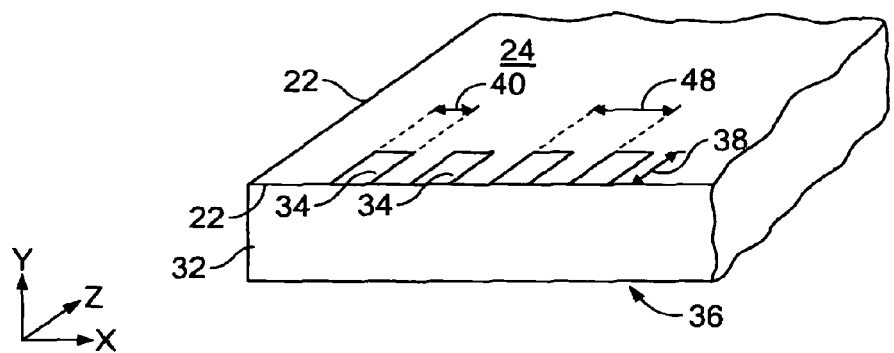
FIG. 6 illustrates the reflector elements formed on the touch surface in accordance with an embodiment of the present invention.

FIG. 6 illustrates the reflector elements 34 formed on the touch surface 24 in accordance with an embodiment of the present invention. The reflector elements 34 are periodically spaced apart by the distance 48 of approximately a wavelength of the edge waves ($\lambda_E$) traveling along the edge 22. The reflector elements 34 have the width 40 along the X axis of approximately $\lambda_E/2$, the height 38 along the Z axis of approximately $\lambda_E$ or less, and a depth (not shown) along the Y axis. As discussed previously, the depth dimension may extend outward from an outer surface of the touch surface 24 if the reflector elements 34 are formed of additional material, or extend inward from the outer surface of the touch surface 24 if the reflector elements 34 are formed by removing material from the substrate 20. Optionally, reflector elements 34 may be formed on both the touch surface 24 and sidewalls 32 such as by combining the reflector elements 34 of FIG. 3 with the reflector elements 34 of FIG. 6.

As edge wave power density is very close to zero when more than a wavelength away from the edge 22, structures more than one wavelength away will have essentially no coupling to the edge wave. In contrast, any perturbation of the edge 22 and any perturbation within one wavelength of the edge 22 on the touch surface 24 or the sidewalls 32 will scatter edge wave energy. Therefore, by varying the nature (mass loading, stiffness perturbation, etc.), geometry and location of the reflector elements 34, the relative strengths of coupling between the edge wave and various other acoustic modes (Rayleigh waves, Lamb waves, shear waves, etc.) can be tuned.

Coupling between edge waves and Rayleigh waves is of interest. High touch sensitivity and lack of dispersion make Rayleigh waves attractive as a touch sensing acoustic mode. Furthermore, the depth profiles of Rayleigh waves and edge waves are very similar thus making strong and preferential coupling to Rayleigh waves easier than edge wave coupling to other modes. Numerical simulations may be used to optimize the perturbation design to optimize edge wave coupling to Rayleigh waves or to an alternate touch-sensitive acoustic mode.

The desired nature of the reflector elements 34 depends in part on the desired touch-sensing acoustic mode. Each individual reflector element 34 is intended to reflect only a small portion of the incident edge wave energy, and therefore in the case of the grooved reflector elements 88 of FIG. 5, the depth 84 into the substrate 20 is generally much less than $\lambda_E$, e.g., of order of a percent of a wavelength or a few microns, and can be adjusted to achieve desired tradeoffs between acoustic loss and conversion efficiency between the one-dimensional edge waves and the two-dimensional surface acoustic waves.

The reflective arrays 30 can be designed to couple edge waves to Rayleigh waves that propagate across the touch surface 24 at a diagonal angle, rather than perpendicular to the edge 22. The distance 48 between the reflector elements 34 can be adjusted to tune the reflective angle. If s represents the distance 48 and θ is the angle of the Rayleigh wave propagation direction with respect to normal to the edge 22, the condition for coherent scattering at angle θ is:

$$s \sin(\theta) = s(\lambda_R/\lambda_E) - n \lambda_R,$$

where n is an integer, $\lambda_R$ represents the wavelength of the Rayleigh wave, and $\lambda_E$ represents the wavelength of the edge wave.

Figure 7:
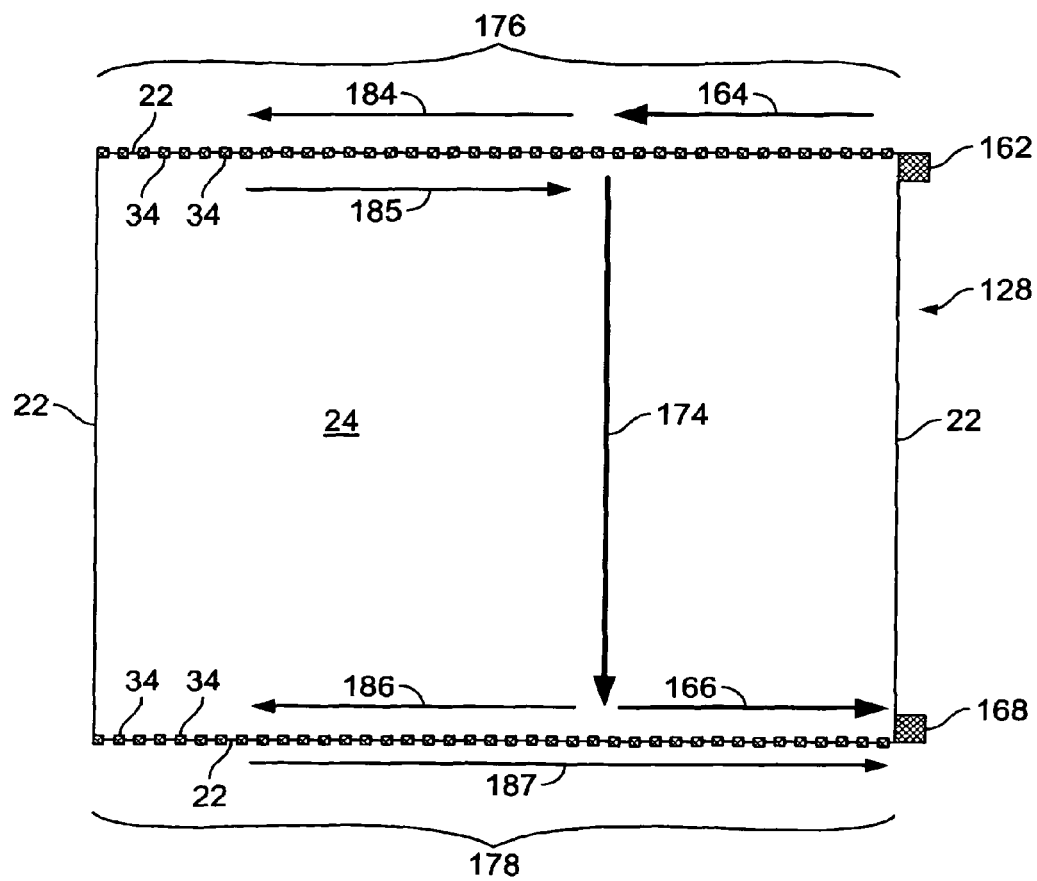
FIG. 7 illustrates a touch screen having regularly spaced reflector elements in accordance with an embodiment of the present invention.

FIG. 7 illustrates a touch screen 128 having regularly spaced reflector elements 34 in accordance with an embodiment of the present invention. For simplicity, reflector elements 34 are illustrated on only two of the four edges 22, namely for the transmitting reflector element array 176 and receiving reflector element array 178. It should be understood that the reflector elements 34 may be formed as discussed previously in FIGS. 3-6. The reflector elements 34 are periodically spaced apart by the distance 48 of approximately a wavelength of the edge wave ($\lambda_E$) traveling along the edge 22.

Arrows 164, 174, and 166 illustrate a desired acoustic path from transmit transducer 162 to the receive transducer 168. Also illustrated in FIG. 7 are undesired acoustic paths leading to interfering signals at receive transducer 168. The undesired acoustic paths are caused by 180° backscattering of edge waves by the reflector arrays 176 and 178. The array of regularly spaced reflector elements 34 having wavelength spacing (distance 48) as needed for 90° scattering of SAW to edge waves may also lead to 180° backscattering of the edge wave.

A first edge wave is propagated by the transmit transducer 162 along edge 22 in the direction of arrow 164. The edge wave is converted by the reflector elements 34 of the transmitting reflector element array 176 to a SAW wave traveling across the touch surface 24 in the direction of arrow 174. Some of the edge wave power from transmit transducer 162 will continue propagating along the edge 22 as shown by arrow 184. If reflector elements 34 backscatter edge waves by 180°, an undesired edge wave will be generated in the direction of arrow 185. This undesired edge wave will also be scattered and mode converted at 90°, thus contributing an undesired delayed contribution to the Rayleigh wave (arrow 174), eventually leading to a parasitic interfering signal at receive transducer 168.

Furthermore, 180° edge-wave backscattering also generates undesired parasites at the receiving reflector element array 178. The desired SAW wave (arrow 174) is converted to two edge waves by the regularly spaced reflector elements 34 of the receiving reflector element array 178. Therefore, a second edge wave traveling in the direction of arrow 166 to receiving transducer 168 and an undesired parasitic edge wave traveling in the direction of arrow 186 are created. The parasitic edge wave may then be backscattered by 180° back towards the receive transducer 168 by the reflector elements 34 as illustrated by arrow 187. It is desirable to design reflector elements 34 in such a manner to minimize the 180° edge-wave backscattering in order to minimize the amplitudes of the parasitic paths shown in FIG. 7.

Figure 8:
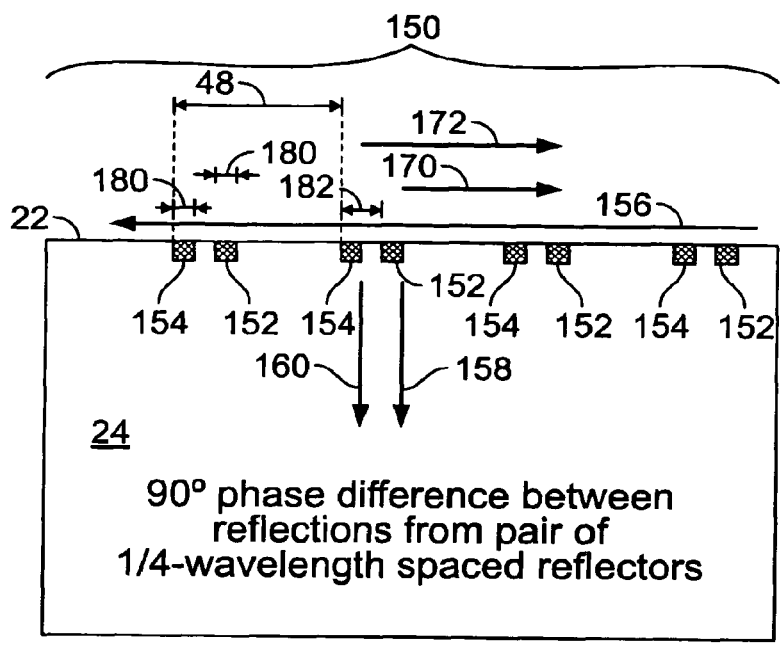
FIG. 8 illustrates a reflector array design which minimizes back reflection of an edge wave in accordance with an embodiment of the present invention.

FIG. 8 illustrates a reflector array design 150 which minimizes back reflection of an edge wave in accordance with an embodiment of the present invention. Such designs are applicable to both transmit and receive arrays such as items 176 and 178 of FIG. 7. First and second reflector elements 152 and 154 are illustrated on the touch surface 24 of the substrate 20, but it should be understood that the first and second reflector elements 152 and 154 may be formed on the sidewalls 32 in addition to, or instead of, the touch surface 24. In addition, the first and second reflector elements 152 and 154 may be formed as grooves or protrusions. The first reflector elements 152 are spaced 1 wavelength of the edge wave apart with respect to each other. The second reflector elements 154 are shifted with respect to the first reflector elements 152 by a distance 182 substantially equivalent to one-quarter wavelength of the edge wave. First and second reflector elements 152 and 154 have a width 180 of less than one-quarter wavelength, equal to one-quarter wavelength, or larger than one-quarter wavelength, in which case reflector elements 152 and 154 are overlapping or superposed.

In other words, the reflector array design 150 may be created by first designing the first reflector elements 152 without regard to the need to suppress 180° back reflection of edge waves. The first reflector elements 152 are then shifted by one-quarter wavelength (in either direction) to create the second reflector elements 154. The second reflector elements 154 are then superposed on the first reflector elements 152.

When an edge wave is propagated along the edge 22 in the direction of arrow 156, a SAW wave 158 and a reflected wave 170 are created by the first reflector 152. A SAW wave 160 and a reflected wave 172 are created by the second reflector 154. Therefore, two SAW waves are created at 90° and 2 reflected edge waves are created at 180° with respect to the direction of propagation of the edge wave.

The reflected waves 170 and 172 have an extra one-half wavelength path and hence a relative phase shift of 180° which substantially cancels or minimizes the 180° back reflection. There is a delay of one-quarter wavelength between the SAW waves 158 and 160 which creates only a 90° phase shift between the two waves which does not lead to cancellation of the scattering amplitude. In other words, if the distance between adjacent first and second reflective elements 152 and 154 along the edge 22 alternates between one-quarter and three-quarters wavelengths, then 180° backscattering will be suppressed while 90° edge-SAW coupling will not be suppressed.

By way of example only, let the coordinate x represent distance along edge 22 shown in FIG. 8. Let P(x) represent the periodic variation of the scattering strength of reflectors 152. P(x) can be Fourier expanded into the form P(x)=ΣPn*exp(i (2πn/λ)x). Below, the condition for minimal 180° back reflection in terms of the Fourier coefficients Pn is considered. (This discussion can be generalized to the case that the strength of the reflectors 152 gradually increases with distance from the transducer as is often desired for signal equalization. In this case, let r(x) be a slowly varying reflector strength weighting as a function of x, and also let R(x)= r(x)*P(x) where P(x) is a periodic function P(x)=P(x+λ) that describes the detailed shape of each groove.)

The scattering of SAW to edge waves at 90° (in direction of arrows 158 and 160) is due to the n=±1 terms in the Fourier series of the groove shape while the 180° backscattering of edge waves (in the direction of arrows 170 and 172) is due to the n=±2 terms of the Fourier series. The undesirable backscattering of the edge waves in the direction of arrows 170 and 172 can be eliminated if the n=±2 terms in the Fourier series are eliminated.

One way to eliminate the n=±2 terms in the Fourier series is to start with an arbitrary periodic function P(x) with nonzero fundamental n=±1 components that couple SAW and edge waves as desired, shift the pattern by one-quarter wavelength and superpose this on the original pattern P(x)→P'(x)={P(x)+P(x+λ/4)} or in terms of the Fourier components $P_n \rightarrow P'_n = (1+i^n)P_n$ so that P'n=0 for n=±2 but not n=±1.

Referring to FIGS. 4 and 5, the reflector elements 86 and 88 are one-half wavelength wide and spaced 1 wavelength apart. This corresponds to a case of FIG. 8 wherein the first and second reflector elements 152 and 154 are each one-quarter wavelength wide and spaced 1 wavelength apart. When the first reflector elements 152 are replicated, shifted by one-quarter wavelength and superposed, the result is a series of reflector elements 86 or 88 having a width 40 of one-half wavelength and being positioned apart the distance 48 of one wavelength.

A transducer may be used to convert electrical signals to acoustic edge waves that propagate along the edge 22. One example of a transducer assembly is a piezoelectric element in combination with a grating element, where the grating element is disposed between the piezoelectric element and the medium, such as substrate 20, in which the generated acoustic mode is to propagate. The grating acts as a diffractive element that couples acoustic energy from the transducer to acoustic waves on the substrate 20.

Figure 9:
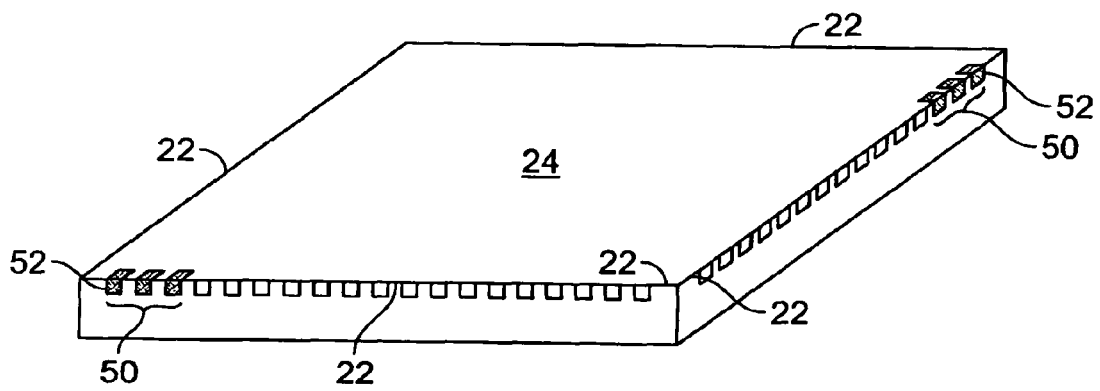
FIG. 9 illustrates a grating comprising a series of periodically spaced grooves formed along the edge of the substrate in accordance with an embodiment of the present invention.

FIG. 9 illustrates a grating 50 comprising a series of periodically spaced grooves 52 formed along the edge 22 of the substrate 20 in accordance with an embodiment of the present invention. The grooves 52 can be formed in the substrate 20 using any suitable manufacturing method, for example, machining, etching, laser ablation, grinding, patterning, molding, and the like.

Figure 10:
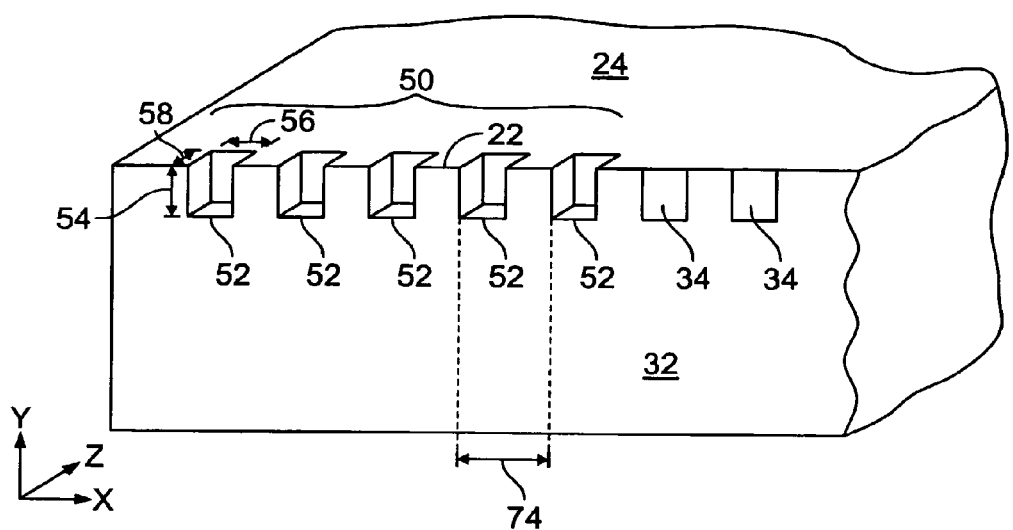
FIG. 10 illustrates an expanded view of the grating in accordance with an embodiment of the present invention.

FIG. 10 illustrates an expanded view of the grating 50 in accordance with an embodiment of the present invention. A height 54 along the Y axis of the grooves 52 is approximately equal to or less than a wavelength of the edge wave $\lambda_E$. A depth 58 of the grooves 52 along the Z axis is approximately equal to or much less than the wavelength of the edge wave $\lambda_E$. The grooves 52 are spaced apart by a distance 74 which is approximately equal to the wavelength of the edge wave $\lambda_E$. The width 56 of the grooves 52 along the X axis is approximately one-half the wavelength of the edge wave, or $\lambda_E/2$. The design of the grating 50 has much in common with the design of reflector arrays comprising grooved reflector elements 88 as shown in FIG. 5 as both serve a similar function of coherently coupling to edge waves. The major difference is in the strength of the coupling. For efficient transducer design, the grating 50 must excite or extract much of the energy of an edge wave in the short length of grating 50 while reflector arrays 30 in FIG. 3 spread out the coupling between edge waves and Rayleigh waves across most of the lengths of the edges 22. As a result, the depth 58 in grating 50 is typically significantly deeper than depth 84 in FIG. 5.

Figure 11:
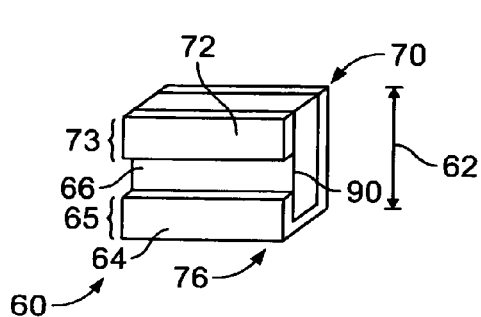
FIG. 11 illustrates a piezoelectric element having wrap-around electrodes that can be used in combination with a diffractive grating to comprise a transducer in accordance with an embodiment of the present invention.

FIG. 11 illustrates a piezoelectric element 90 having wrap-around electrodes that can be used in combination with a diffractive grating to comprise a transducer in accordance with an embodiment of the present invention. A first electrode 64 is present on a lower region 65 of a front side 66 of the piezoelectric element 90 and wraps around a bottom side 76 of the piezoelectric element 90 to a back side 70 of the piezoelectric element 90. A second electrode 72 is present on an upper region 73 of the front side 66 of the piezoelectric element 90. The first and second electrodes 64 and 72 may be comprised of silver frit, printed nickel, or any other conductive material.

The assembly comprising the piezoelectric element 90 and electrodes 64 and 72 is often referred to as a piezo 60. The piezoelectric element 90 is a pressure mode piezoelectric element. PZT (a lead-zirconium-titanate ceramic) is a common material used to fabricate piezoelectric elements, but other piezoelectric materials such as polymer PVDF (polyvinylidene fluoride) and lead-free ceramics may also be used. The height of the active region of the piezo 60 is matched to the vertical profile of the edge wave, i.e., approximately equal to $\lambda_E$ or less. The active region of the piezo 60 is determined by the geometry of the electrode 72 as only the piezoelectric material sandwiched between electrodes 72 and 64 is mechanically excited when a voltage is applied to the electrodes 72 and 64. For handling ease, it is convenient that the piezo dimension 62 can extend beyond the active region and hence is allowed to be much larger than the edge wave wavelength $\lambda_E$.

Figure 12:
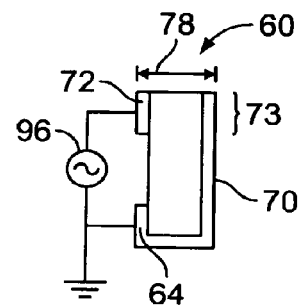
FIG. 12 illustrates an alternating electrical signal being applied to the first and second electrodes of FIG. 11 in accordance with an embodiment of the present invention.

FIG. 12 illustrates an alternating electrical signal 96 being applied to the first and second electrodes 64 and 72 of FIG. 11 in accordance with an embodiment of the present invention. The geometry of the wrap-around first electrode 64 and the second electrode 72 causes only the upper region 73 of the piezo 60 to be electrically active.

Piezoelectric elements 90 typically have a thickness 78 corresponding to one-half wavelength of acoustic waves in the piezoelectric material at the operating frequency. (For clarity, the thickness of electrodes 64 and 72 are exaggerated in FIG. 12.) For a pressure-mode piezo 60 operated at about 5 MHz, the thickness 78 is typically about 400 μm. Electrical connection to the first and second electrodes 64 and 72 can be made using any suitable method, for example, by spring contacts, solder, conductive epoxy (e.g., silver loaded), or a conductive adhesive with directional conductivity (e.g., a Z-axis adhesive having significant conductivity only perpendicular to the plane of the electrodes 64 and 72). Attributes to consider when determining connection methods include a low resistance junction, low electromagnetic interference and susceptibility, high reliability, low cost and the like.

Figure 13:
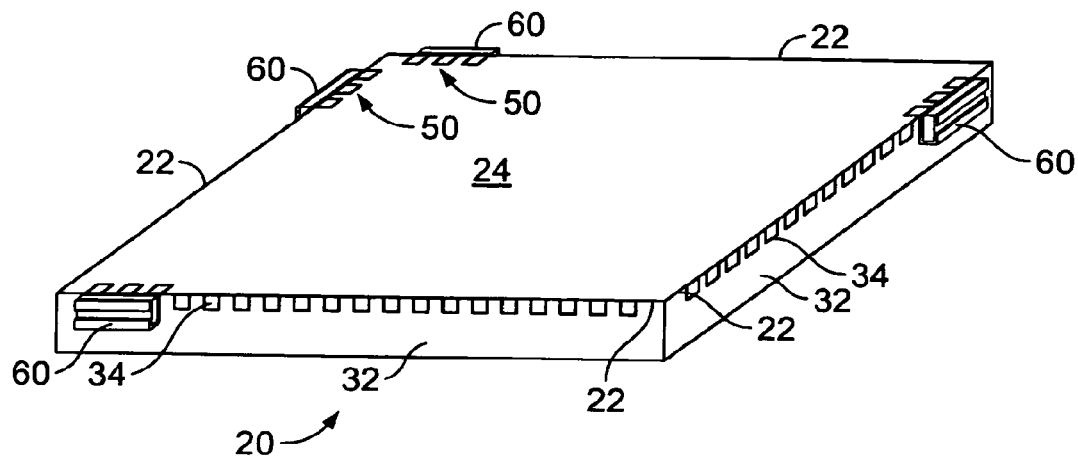
FIG. 13 illustrates the piezo bonded to the sidewalls of the substrate in accordance with an embodiment of the present invention.

FIG. 13 illustrates the piezo 60 bonded to the sidewalls 32 of the substrate 20 in accordance with an embodiment of the present invention. Four piezos 60 are bonded in four different locations along the four different edges 22.

Figure 14:
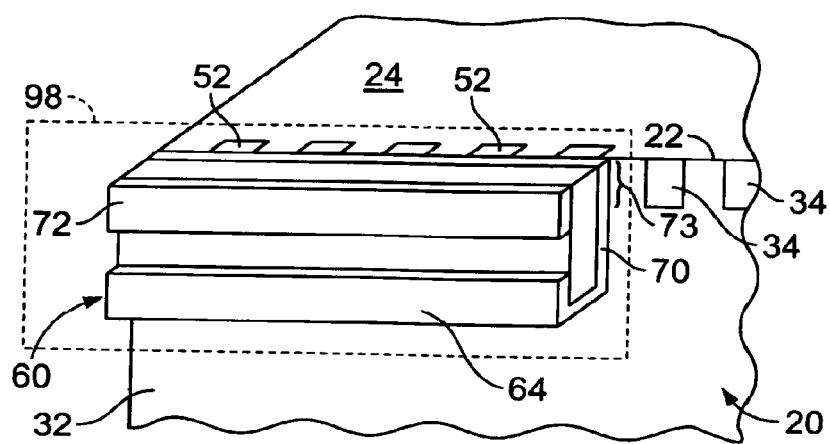
FIG. 14 illustrates an edge wave transducer comprising the piezo bonded over the grating in the sidewall of the substrate in accordance with an embodiment of the present invention.

FIG. 14 illustrates an edge wave transducer 98 comprising the piezo 60 bonded over the grating 50 in the sidewall 32 of the substrate 20 in accordance with an embodiment of the present invention. As shown in FIGS. 13 and 14, the piezos 60 are bonded over the grooves 52 in the grating 50, with the electrically active upper region 73 overlapping the grooves 52. An adhesive can be used to bond the piezo 60 over the grating 50 such that the adhesive fills or partially fills the grooves 52. The mechanical properties of the adhesive can be chosen so that the motions of the piezo 60 are largely decoupled from the sidewall 32 of the substrate 20 in the region of the grooves 52. Alternatively, the grating 50 may be designed to provide strong acoustic coupling between the piezo 60 and the grooves 52. In some applications, it may be desired to choose the adhesive in the grooves 52 to slow the speed of the pressure waves traveling from the piezo 60 to the substrate 20 at the bottom of the grooves 52 so that piezo vibration coupling to the edge waves within the grooves 52 is phase shifted by approximately 180° with respect to coupling between the grooves 52. In this manner, coupling to piezo vibrations within the grooves 52 adds coherently to coupling between the grooves 52 to generate edge waves.

Alternatively, a grating (not shown) can be formed on a side of the piezo 60 instead of on the sidewall 32 of the substrate 20 so that no grating 50 need be fabricated in substrate 20. The grating side of the piezo 60 can then be bonded to the substrate 20 to provide the coupling mechanism between acoustic waves generated by the piezo 60 and an edge wave. Furthermore, as the edge wave is symmetric between the two surfaces forming the edge, such as the edges 22 formed by the intersection of the touch surface 24 and sidewalls 32, edge wave transducer 98 may instead be mounted to the touch surface 24 of the substrate 20. Alternatively, edge wave transducer 98 may be formed on both the sidewalls 32 and touch surface 24.

Figure 15:
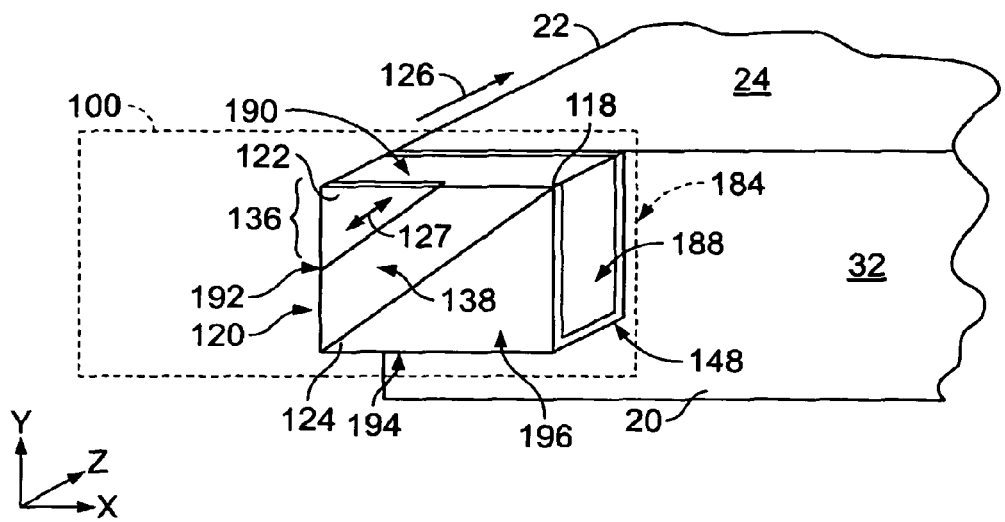
FIG. 15 illustrates an edge wave transducer design incorporating a shear-mode piezoelectric element (shear-mode piezo) in accordance with an embodiment of the present invention.

FIG. 15 illustrates an edge wave transducer design 100 incorporating a shear-mode piezoelectric element (shear-mode piezo) 120 in accordance with an embodiment of the present invention. The shear-mode piezo 120 comprises a piezoelectric material 118 having front side 138, back side 184, and first, second, third and fourth sides 188-194. A first electrode 122 is present on a triangular shaped region 136 on the front side 138 of the piezoelectric material 118. The second electrode 124 is present on a bottom triangular region 196 on the front side 138 of the piezoelectric material 118 and wraps around the bottom side 148 to the back side 184 of the piezoelectric material 118.

The shear-mode piezo 120 is bonded to the sidewall 32 of the substrate 20 and abuts the touch surface 24. The shear-mode piezo 120 is electrically active in the upper left hand corner corresponding to the region 136 and generates motion with polarization or a component of polarization at approximately a 45° angle with respect to the X and Y axes as indicated by double arrow 127. The shear motion of the shear-mode piezo 120 then couples to an edge wave propagating in the Z direction as indicated by arrow 126. Note that the shear-mode piezo 120 directly excites the edge wave; there is no need for a grating structure such as item 50.

Figure 16:
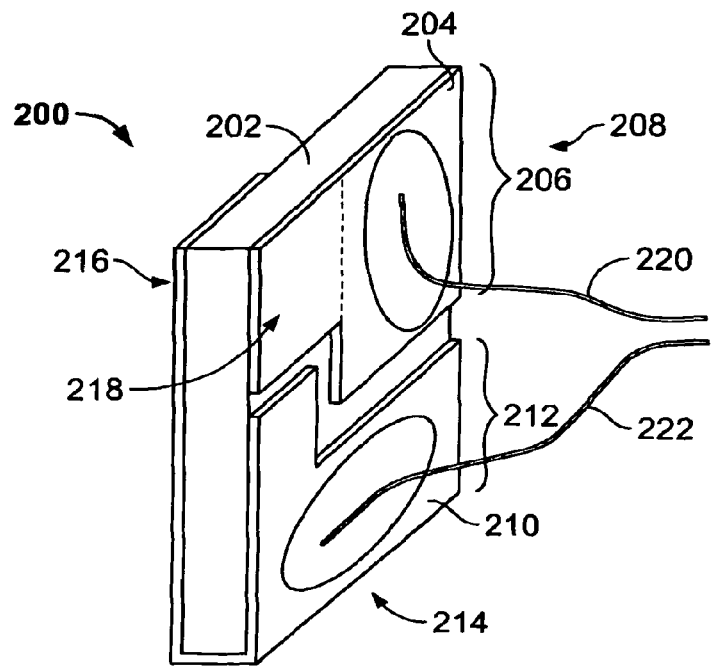
FIG. 16 illustrates an alternative piezo in accordance with an embodiment of the present invention.

FIG. 16 illustrates an alternative piezo 200 in accordance with an embodiment of the present invention. A front electrode 204 is present on an upper region 206 of a front side 208 of a piezoelectric element 202. A back electrode 210 is present on a lower region 212 on the front side 208 of the piezoelectric element 202 and wraps around a bottom side 214 to a back side 216 of the piezoelectric element 202. The back electrode 210 extends along the back side 216 to cover the upper region 206 of the piezoelectric element 202 only in an active region 218.

A first electrical connection 220 is interconnected with the front electrode 204 by soldering, wire-bonding, or other interconnection methods. A second electrical connection 222 is interconnected with the back electrode 210. The size of the piezo 200 is larger than the active region 218 to allow room to connect the first and second electrical connections 220 and 222 to the front and back electrodes 204 and 210 for ease of manufacturing, while limiting the size and shape of the active area 218 to prevent scattering too much energy. Opposite polarities are applied to the front and back electrodes 204 and 210. The size of the active area 218 is, by way of example only, of order of one-tenth of a square edge-wave wavelength, i.e. $\approx 0.1 * \lambda_E^2$. As wavelength varies inversely with operating frequency, the active area 218 tends to decrease if the piezo 200 is designed for a higher operating frequency. FIG. 16 illustrates an example where the active area 218 is square in shape. Other shapes for the active area 218 are possible with appropriate shaping of electrodes 204 and 210 to produce the desired overlap geometry.

The piezos in FIGS. 15 and 16 limit excitation of the substrate 20 to a small region corresponding to the cross sectional area of a propagating edge wave. In these piezos, piezoelectric excitation is limited to the desired edge-wave cross-sectional area. An alternate approach is to piezoelectrically excite a larger piezo area, such as create a larger active area 218, but limit mechanical coupling between the piezo 200 and the substrate 20 to the small cross-sectional area of the propagating edge wave.

Figure 17:
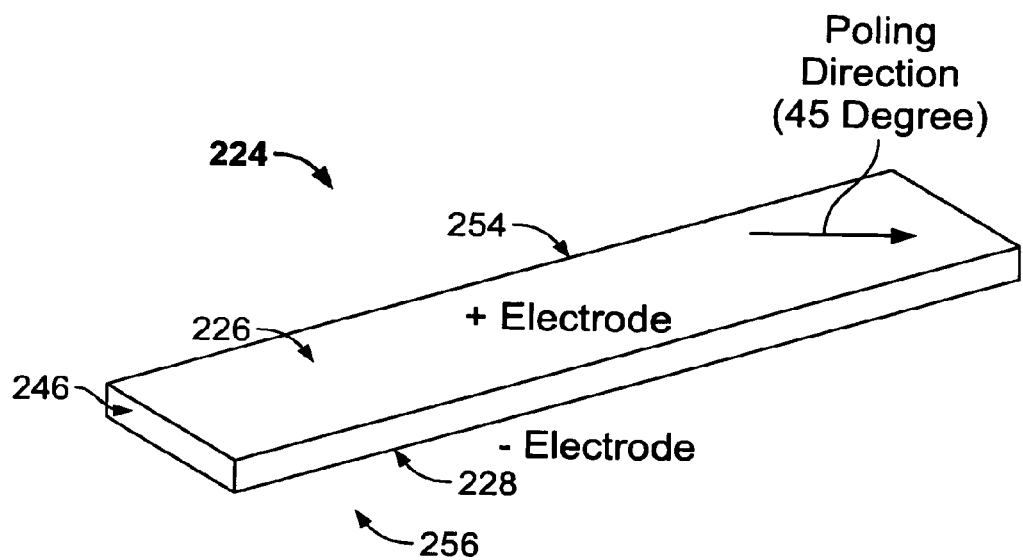
FIG. 17 illustrates a piezo having front and back electrodes on opposite sides of the piezoelectric element in accordance with an embodiment of the present invention.

FIG. 17 illustrates a piezo 224 having front and back electrodes 226 and 228 on opposite sides of piezoelectric element 246 in accordance with an embodiment of the present invention. A front electrode 226 and a back electrode 228 substantially cover a front side 254 and back side 256, respectively, of a piezoelectric element 246. As in the piezos of FIGS. 15 and 16, the piezo 224 is poled to produce a shear-mode piezo with shear motion in a 45° direction. When such a piezo 224 is bonded to a corner of the substrate 20, a stiff adhesive such as epoxy may be used in the desired active area to accomplish strong mechanical coupling to the substrate 20 while an air gap or a weak shear coupling material such as silicone rubber (RTV) can be used elsewhere. If it is desirable to make electrical connections to both front and back electrodes 226 and 228 on the same surface, a wrap around electrode may be used as shown in FIG. 18.

Figure 18:
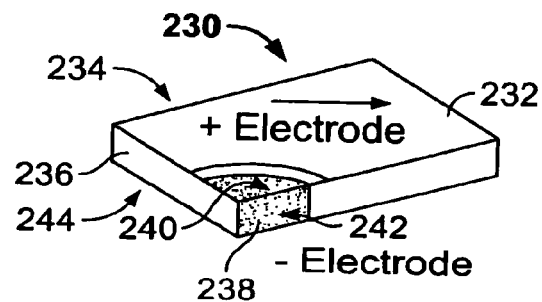
FIG. 18 illustrates an alternative piezo in accordance with an embodiment of the present invention.

FIG. 18 illustrates an alternative piezo 230 similar to that shown in FIG. 17 in accordance with an embodiment of the present invention. A front electrode 232 is present on a front side 234 of a piezoelectric element 236. A back electrode 238 is present on a corner region 240 on the front side 234 of the piezoelectric element 236 and wraps around a portion of a side 242 to a back side 244 of the piezoelectric element 236. The back electrode 238 extends along the back side 244 to cover the piezoelectric element 236, forming an active region where the front electrode 232 and back electrode 238 overlap. In the alternative piezo 230, nearly the entire area of the piezo 230 is piezoelectrically active. Appropriate design and fabrication of the bond between the piezo 230 and the substrate 20 limit the acoustic coupling to the substrate 20 to the desired region for edge-wave generation and reception.

Figure 19:
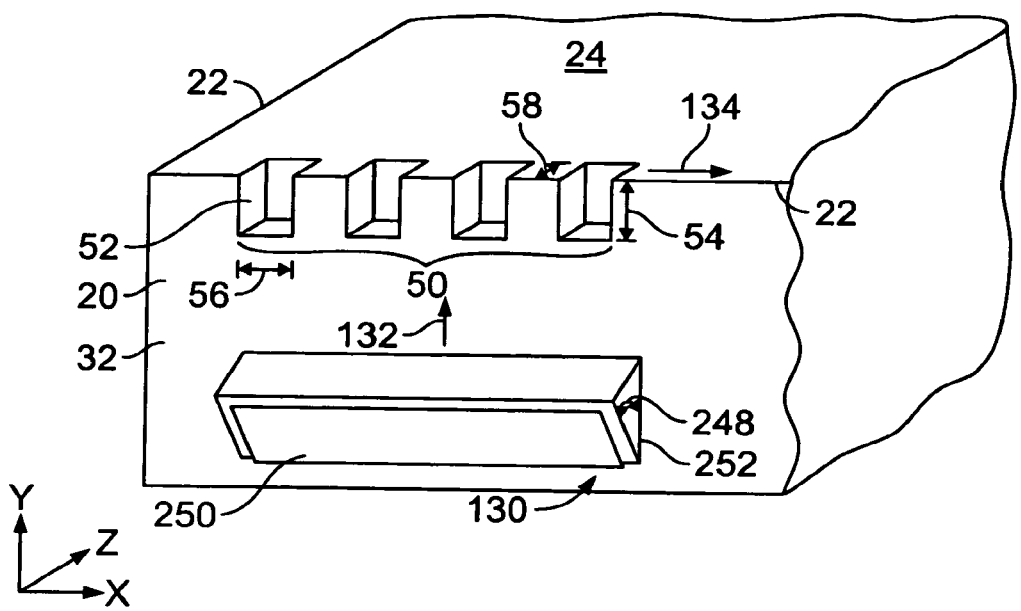
FIG. 19 illustrates a wedge transducer assembly mounted to the sidewall of the substrate in accordance with an embodiment of the present invention.

FIG. 19 illustrates a wedge transducer assembly 130 mounted to the sidewall 32 of the substrate 20 in accordance with an embodiment of the present invention. A piezoelectric element 250 is mounted to one side of a wedge 252. An opposing side of the wedge 252 is mounted to the sidewall 32 of the substrate 20. The tilt of piezo element 250 with respect to the vertical surface of sidewall 32 defines an angle 248 of the wedge 252. This wedge angle 248 is controlled so that bulk pressure waves excited by the piezo 250 and propagating in the wedge 252 can couple to vertically propagating Rayleigh waves on sidewall 32 of substrate 20.

When excited, the piezoelectric element 250 launches a bulk wave in the wedge 252. A surface acoustic Rayleigh wave (SAW) is launched and propagates along the sidewall 32 as indicated by arrow 132; therefore propagating perpendicular to edge 22 in FIG. 19. The Rayleigh wave in turn interacts with the grating 50 which comprises grating elements 52. As described above, the grating elements 52 have a height 54 in the Y axis direction approximately equal to or less than the wavelength of an edge wave $\lambda_E$ and are spaced apart by approximately $\lambda_E$. The width 56 of the grating elements 52 is approximately $\lambda_E/2$. The grating 50 can couple two-dimensional surface waves (the Rayleigh waves) to a one-dimensional edge wave, thereby launching an edge wave as indicated by arrow 134 along the edge 22.

The transducer design of FIG. 19 may lead to a parasitic SAW path between transmit/receive pairs of wedge transducer assemblies 130. For example, parasitic components of the first SAW launched by the wedge transducer assembly 130 can propagate up the sidewall 32, across the sensor surface 24, and down the opposite sidewall 32 to a receiving wedge transducer placed on the opposite sidewall 32. This parasitic path can be interrupted by tilting the wedge transducer assembly 130 with respect to the edge 22.

Figure 20:
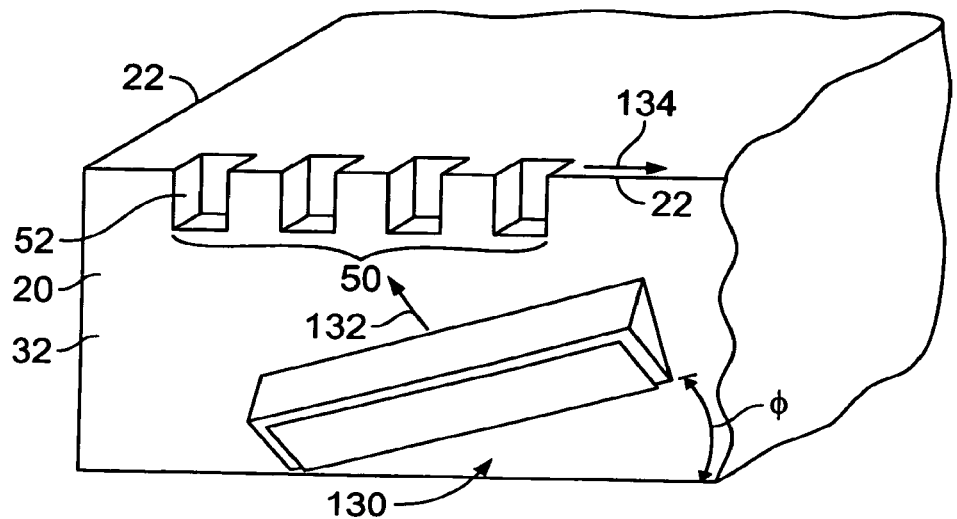
FIG. 20 illustrates the wedge transducer assembly being tilted with respect to the edge in accordance with an embodiment of the present invention.

FIG. 20 illustrates the wedge transducer assembly 130 being tilted with respect to the edge 22 in accordance with an embodiment of the present invention. Therefore, the angle of intersection between the Rayleigh wave launched by the wedge transducer assembly 130 and the edge 22 is different than 90°. The spacing s between the grooves 52 of the grating 50 for coupling between a SAW launched at an angle φ is given by the following relation:

$$1 = s/\lambda_E + s^* \sin(\phi)/\lambda_R.$$

Figure 21:
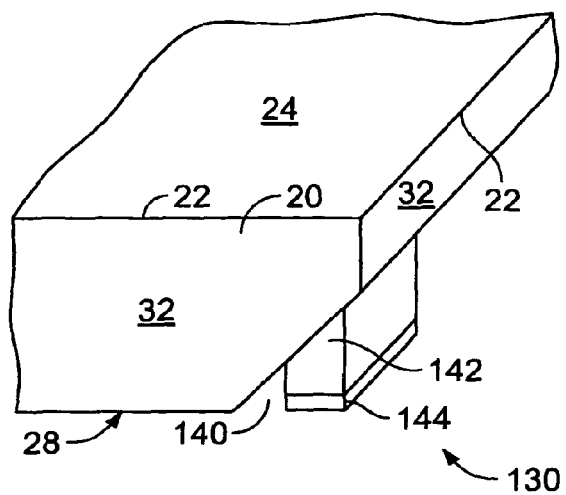
FIG. 21 illustrates a wedge transducer assembly mounted to the substrate in accordance with an embodiment of the present invention.

FIG. 21 illustrates a wedge transducer assembly 130 mounted to the substrate 20 in accordance with an embodiment of the present invention. A portion of the substrate 20 of the opposing surface 28 opposite the touch surface 24 can be removed to form an angled recess 140 at a corner proximate intersecting planes formed by two of the sidewalls 32. The wedge transducer assembly 130 including the wedge 142 and the piezoelectric element 144 can be mounted in the recess 140. Therefore, wedge transducer assembly 130 does not protrude beyond the planes of the sidewalls 32 or substrate surfaces 24 and 26.

Figure 22:
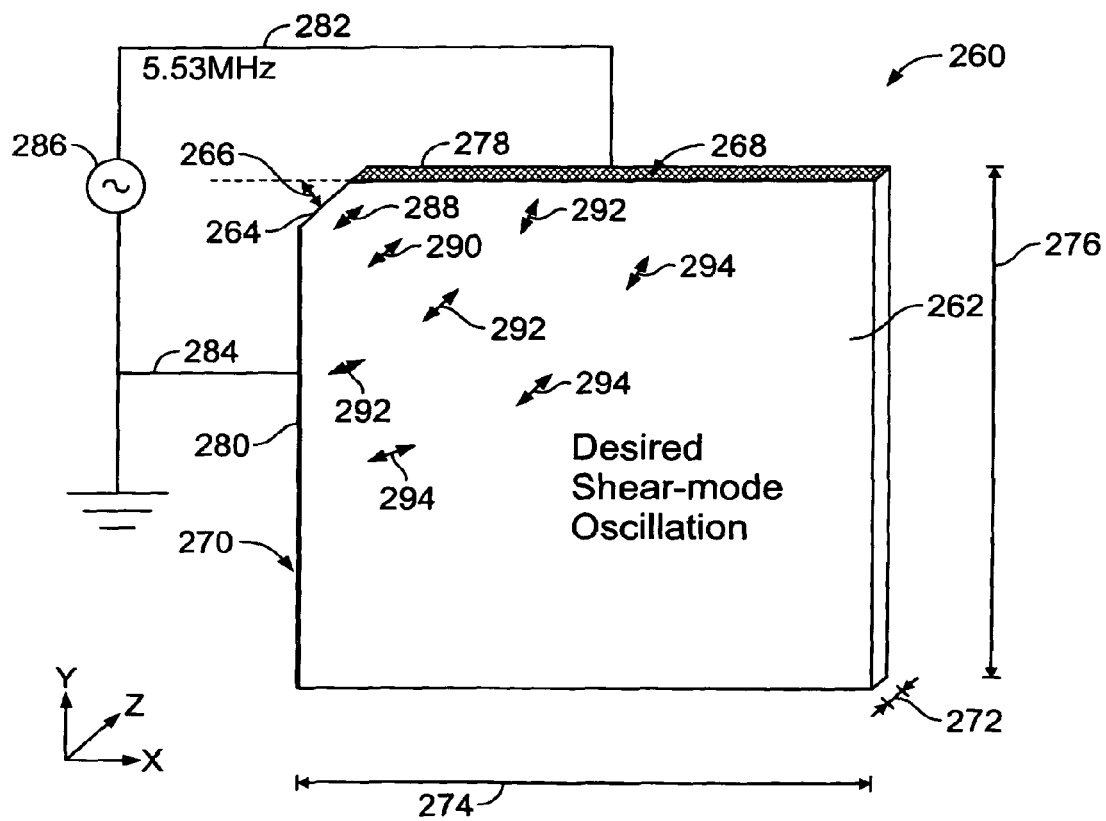
FIG. 22 illustrates an alternative piezo in accordance with an embodiment of the present invention.

FIG. 22 illustrates an alternative piezo 260 in accordance with an embodiment of the present invention. The piezo 260 comprises a piezoelectric element 262 having a notched corner 264. The notched corner 264 may be formed having an angle 266 of approximately 45° with respect to planes formed by first and second edges 268 and 270 of the piezoelectric element 262.

By way of example only, for 5.5 MHz operation, the piezoelectric element 262 may be approximately 200 microns in depth 272 along the Z axis. More generally, depth 272 is chosen so that there is a shear-mode resonance at the operating frequency, that is, depth 272 is approximately equal to one-half of a bulk shear wave wavelength in the material of piezoelectric element 262. The width 274 and height 276 along the X axis and Y axis, respectively, of the piezoelectric element 262 may each be 2 mm. First and second electrodes 278 and 280 may be formed on the first and second sides 268 and 270, respectively. Poling is accomplished along the Z axis.

Figure 23:
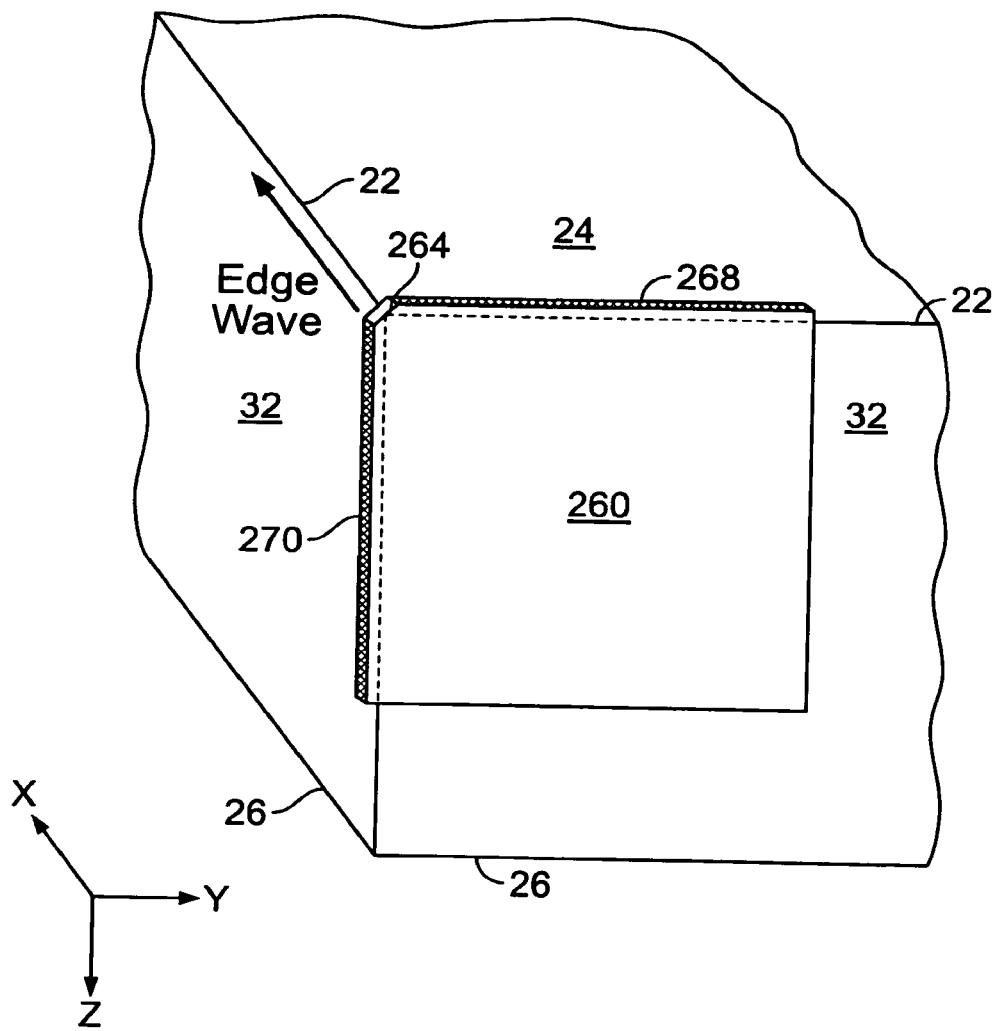
FIG. 23 illustrates the piezo mounted to the substrate in accordance with an embodiment of the present invention.

FIG. 23 illustrates the piezo 260 mounted to the substrate 20 in accordance with an embodiment of the present invention. Mounting is similar to that shown in FIG. 15 for the shear-mode piezo 120. The piezo 260 may be mounted to the substrate 20 having the notched corner 264 mounted flush with edge 22 as shown in FIG. 23. Alternatively piezo sides 268 and 270 may be flush with surfaces of substrate 20.

By mounting the piezo 260 such that the piezo sides 268 and 270 form an overhang beyond the touch surface 24 and sidewall 32, greater efficiency may be achieved. The amount of overhang, or the distance the piezo sides 268 and 270 extend beyond the touch surface 24 and sidewall 32, may be equal to or less than an edge-wave wavelength. The overhang design may be applied equally to transducers based on the piezo design of FIGS. 15, 16 and 18, as well as the transducer design of FIG. 14.

Returning to FIG. 22, wires 282 and 284 may be attached to the first and second electrodes 278 and 280 as previously discussed. When excited by an alternating electrical signal 286, motion, or shear-mode oscillation, is generated within the piezoelectric element 262 as indicated by arrows 288-294. The strength of the vibration is stronger within the piezoelectric element 262 close to the notched corner 264, as indicated by arrow 288. Moving further away from the notched corner 264, the strength of the vibration and amplitude of the shear-wave decreases in a controlled manner.

The basic edge-wave excitation mechanism is the same for the shear-mode piezo 120 and piezo 260 in FIGS. 15 and 23, respectively. An advantage of piezo 260 of FIGS. 22 and 23 is that by appropriate design of the notch 264 geometry and the placement of the piezo 260 on substrate 20, the piezoelectric excitation pattern can be closely matched to the cross sectional profile of edge wave motion. This maximizes the ratio of piezo coupling to the desired edge-wave mode relative to parasitic coupling to other modes.

Figure 24:
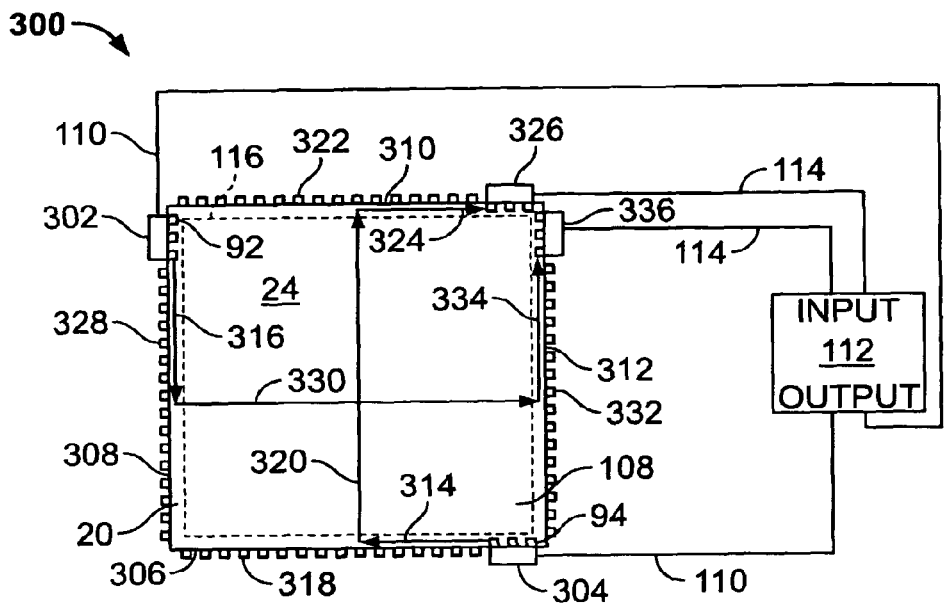
FIG. 24 illustrates an edge wave touch sensor system formed in accordance with an embodiment of the present invention.

Because edge wave cross sections are very small, piezos, such as piezo 260, are very small and have high impedance when compared to the impedances of 50Ω of conventional transducers used to generate the SAW. As impedance is inverse with respect to the size of the active area, impedance is now into the kΩ region. Therefore, it should be understood that the controllers, such as the controller 112 in FIG. 24, are preferable designed to match the high impedance of the piezos. Known electronic principles may be used, such as matching the input impedance of the receiver circuit to the impedance of the receive transducer.

FIG. 24 illustrates an edge wave touch sensor system 300 formed in accordance with an embodiment of the present invention. The touch sensor system 300 comprises the substrate 20 having the touch surface 24 and sidewalls 32 (not shown). For clarity, the edges 22 have been indicated as edges 306, 308, 310 and 312.

A controller 112 supplies electrical signals to transmitting transducers 302 and 304 via electrical connections 110 to excite the piezos of the transmitting transducers 302 and 304. Gratings 92 and 94 convert piezo vibrations to a first acoustic mode, such as edge wave 314 traveling along edge 306 and edge wave 316 traveling along edge 308, respectively, as indicated by arrows. The edge wave 314 is converted by reflective array 318 into Rayleigh wave 320. The Rayleigh wave 320 travels as a surface acoustic wave bound to the surface 24 until it encounters reflective array 322, where it is converted back into an edge wave 324 and travels along the edge 310 in the direction indicated by an arrow where it can be detected by receiving transducer 326. Similarly, the edge wave 316 is converted by reflective array 328 into Rayleigh wave 330. The Rayleigh wave 330 travels as a surface acoustic wave bound to the surface 24 until it encounters reflective array 332, where it is converted back into an edge wave 334 and travels along the edge 312 in the direction indicated by an arrow where signal amplitudes of the edge wave can be detected by receiving transducer 336. Electrical connections 114 are made so that receiving transducers 326 and 336 can supply electrical signals back to the controller 112. Perturbations (e.g., a touch with a finger or stylus) to the touch surface 24 can then be detected as perturbations in the signals from the edge wave on the receiving edge, and a location associated with the perturbation can be determined based on the time the perturbation is detected in the received signal. The electrical connections 110 and 114 can comprise cable harnesses.

A touch sensitive region 108 is formed on the touch surface 24 and comprises essentially the entire touch surface 24 because the reflective arrays 318, 322, 328, and 332 and transducers 302, 304, 326, and 336 may be formed along and/or joined to a very narrow outer periphery 116 of the sensor substrate 20, and in many cases can be made on and/or joined to the sidewalls 32 of the substrate 20. The outer periphery 116 of the touch surface 24 that is needed for the generation and detection of the one-dimensional edge waves can be as little as 1 mm.

Alternatively, the surface acoustic wave (e.g., two-dimensional SAW) can be detected directly after traversing at least a portion of the touch sensitive region 108 without being converted to an edge wave to identify the presence and location of perturbations to the touch sensitive region 108 of the touch surface 24.

FIG. 24 may be modified to provide two-dimensional touch position coordinates using two transmit/receive transducers as discussed previously. In addition, many other touchscreen geometries using edge waves are possible, including touchscreen designs with non-orthogonal acoustic paths that can be adapted for use with edge waves.

Figure 25:
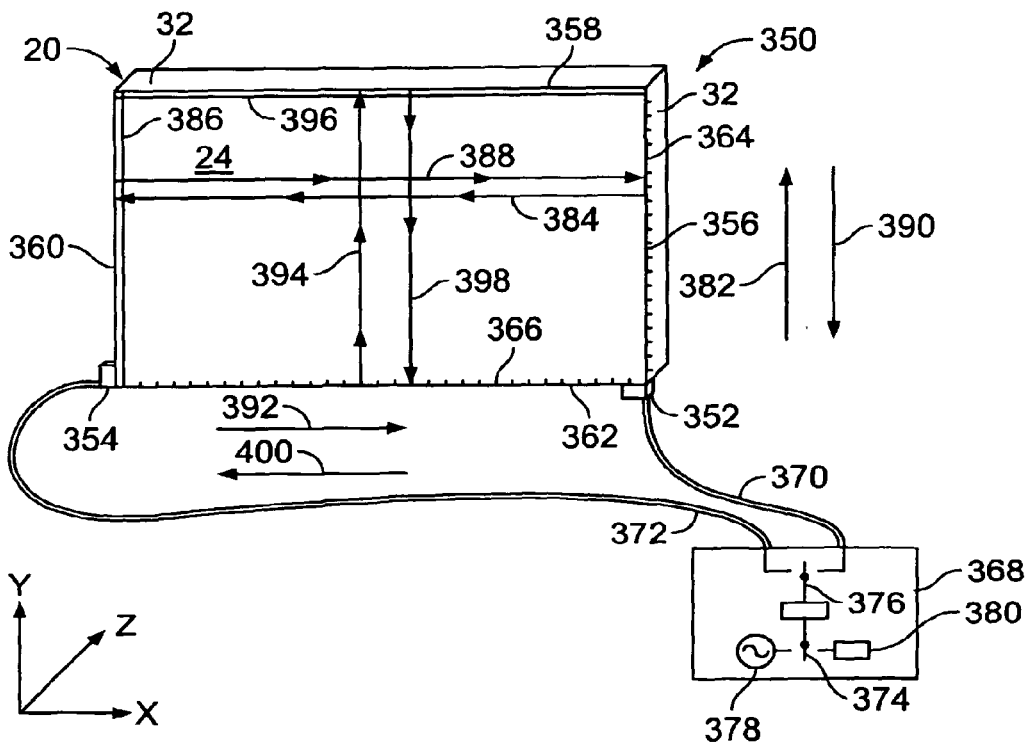
FIG. 25 illustrates a touch panel in accordance with in embodiment of the present invention.

FIG. 25 illustrates a touch panel 350 in accordance with in embodiment of the present invention. Clean edges 356-362 are formed on the substrate 20. Reflector elements 364 and 366 are formed on the sidewall 32 or touch surface 24 proximate two of the edges 356 and 362. The reflector elements 364 are illustrated as being formed on the sidewall 32 proximate the edge 356 and the reflector elements 366 are illustrated as being formed on the touch surface 24 proximate the edge 362. Piezos 352 and 354 are used to both transmit and receive edge wave information.

Only one piezo 352 or 354 can be actively transmitting or receiving at one time. A controller 368 may communicate with each of the piezos 352 and 354 via electrical connections 370 and 372. The controller 368 may have switches 374 and 376 to control which piezo 352 or 354 is connected to a signal generator 378 for transmitting a signal or an electronics module 380 for receiving and decoding a signal. The controller 368 may alternate between the piezos 352 and 354, wherein the piezo 352 may transmit and receive a signal followed by the piezo 354 transmitting and receiving a signal. Alternately, electrical connections 370 and 372 may each be provided with one of two identical circuits each with a transmit/receive mode switch.

Upon activation, the piezo 352 transmits an edge wave in the direction of arrow 382. The edge wave encounters the reflector elements 364 and is converted to a SAW coupled to the surface of the touch surface 24 and transmitted in the direction of arrow 384. A significant fraction of SAW propagating in direction 384 will be reflected by edge 360. Alternatively, one or more reflective strips 386 may be placed one-half wavelength apart on the touch surface 24 proximate and parallel to the edge 360. The edge 360 and/or the reflective strips 386 reflect the SAW by 180° in the direction of arrow 388. When the SAW encounters the edge 356 and the reflector elements 364, the SAW is converted to an edge wave transmitted in the direction of arrow 390. The edge wave is detected by the piezo 352 and the electrical signal is read by the controller 368 via the electrical connection 370.

The controller 368 then transmits an electrical signal from the signal generator 378 over the electrical connection 372 to excite piezo 354. The piezo 354 generates an edge wave traveling along the edge 362 in the direction of arrow 392. As the edge wave encounters the reflective elements 366, the edge wave is converted to a SAW traveling across the touch surface 24 in the direction of arrow 394. The SAW is reflected 180° by the edge 358 and/or one or more reflective strips 396. The reflected SAW travels in the direction of arrow 398, encounters the edge 362 and reflective elements 366, and is converted to an edge wave traveling in the direction of arrow 400. The piezo 354 detects the edge wave and sends an electrical signal over the electrical connection 372 to the controller 368.

Figure 31:
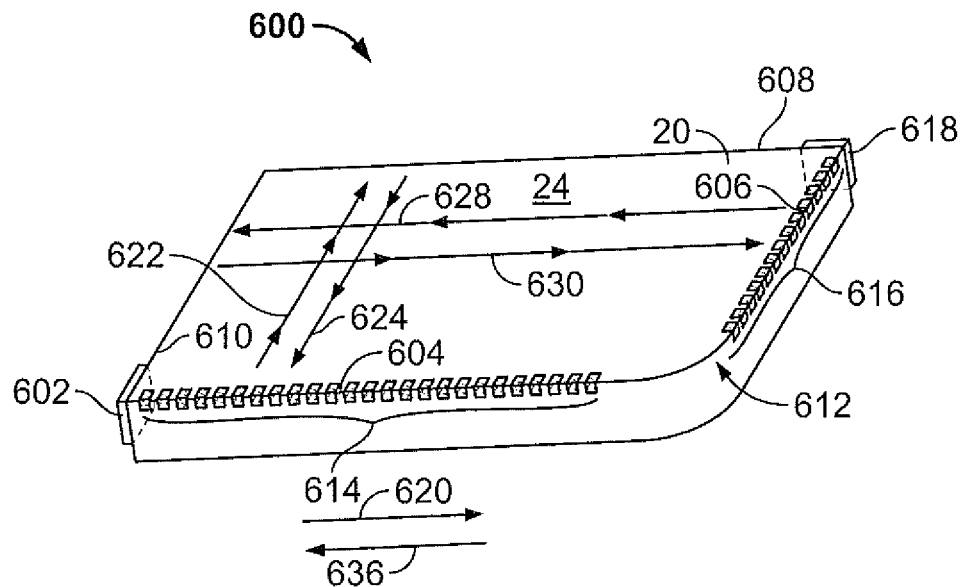
FIG. 31 illustrates an alternative edge wave touch sensor system formed in accordance with an embodiment of the present invention.

FIG. 31 illustrates an alternative edge wave touch sensor system formed in accordance with an embodiment of the present invention. A single transducer 602 operates in both transmit and receive modes to provide two-dimensional touch coordinate information while utilizing a very narrow border region of the touch surface 24. The transducer 602 may be any transducer design capable of transmitting and receiving edge waves, such as transducer designs previously discussed.

The substrate 20 is formed having clean edges 604-610. A rounded corner 612 is formed where the edges 604 and 606 intersect. The rounded corner 612 is also formed having a substantially clean edge, and may have an angle of approximately 90°. Reflector arrays 614 and 616 are formed on the edges 604 and 606, respectively. An absorbing damper 618 is formed on one end of the sidewall 32 proximate the edge 608 and proximate one end of the reflective array 616. It should be noted that the waveguide properties of the edge enable a very simple and efficient way to redirect edge waves by 90° between the reflector arrays 614 and 616 for acquiring both X and Y touch data, namely, the sidewall 32 may be formed having a simple quarter-circle shaping of the sidewall 32 and corresponding edges 604 and 606.

The transducer 602 transmits an edge wave in the direction of arrow 620 along the edge 604. A portion of the transmitted edge wave is scattered by the reflector array 614 and traverses the touch surface 24 in the direction of arrow 622 as a Rayleigh wave. The wave is reflected by 180° in the direction of arrow 624 and again by the reflector array 614 in the direction of arrow 626 to be received by the transducer 602. This portion of the transmitted edge wave is received relatively early in time and provides a measurement of the X coordinate of a touch.

Another portion of the transmitted edge-wave from the transducer is transmitted through the reflector array 614, follows the rounded corner 612 and encounters the reflector array 616. The edge-wave power is partially scattered at 90° as a Rayleigh wave in the direction of arrow 628 and traverses the touch surface 24 as a Rayleigh wave. The wave is reflected by 180° by the edge 610 in the direction of arrow 630, and reflected by the reflector array 616 and received by the transducer 602. This portion of the transmitted edge-wave is received relatively late in time and provides a measurement of the Y coordinate of a touch. Any remaining portion of the transmitted edge-wave that is transmitted through both the reflector arrays 614 and 616 may be eliminated with the absorbing damper 618.

Figure 26:
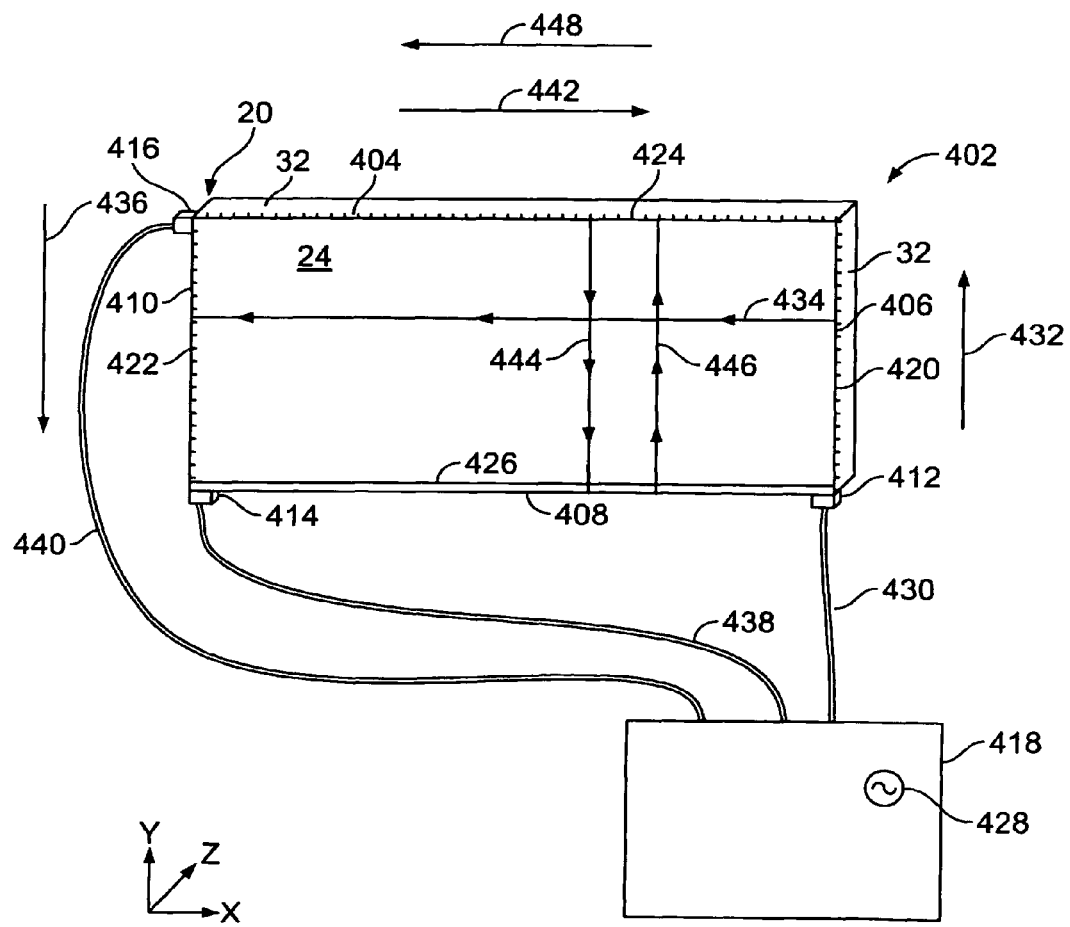
FIG. 26 illustrates a touch panel in accordance with an embodiment of the present invention.

FIG. 26 illustrates a touch panel 402 in accordance with an embodiment of the present invention. The touch panel 402 comprises a substrate 20 with sidewalls 32 as discussed previously. Clean edges 404-410 have been formed at an intersection between the planes of each of the sidewalls 32 and the touch surface 24. The substrate 20 is formed having one dimension of the touch surface 24 greater than the other. For example, the substrate 20 along the X dimension is longer than in the Y direction.

Acoustic waves traveling longer acoustic path lengths in a touch sensor or touch sensor system will experience more loss than those traveling shorter acoustic path lengths. Therefore, to make touch sensitivity relatively uniform throughout the touch sensitive region of a touch sensor, it is often desired to effect an equalization of signals resulting from acoustic waves traveling different acoustic path lengths so that signal levels are approximately independent of acoustic path length.

Reflector elements 420, 422 and 424 have been formed proximate the edges 406, 410 and 404, respectively. As discussed previously, the reflector elements 420-424 may be formed as regularly spaced grooves or protrusions on the sidewalls 32 and/or the touch surface 24. Optionally, one or more reflective strips 426 may be formed on the touch surface 24 proximate the edge 408.

The touch panel 402 uses three piezos 412, 414 and 416. The piezo 412 may be used to transmit signals while the piezo 414 is used to receive signals. A signal generator 428 within controller 418 transmits a signal over electrical connection 430. The transmitting piezo 412 launches an edge wave along edge 406 in the direction of arrow 432. The edge wave is partially reflected by the reflector elements 420 and is converted to a SAW moving across the touch surface 24 in the direction of arrow 434. The SAW is converted to an edge wave by the reflector elements 422 and travels along the edge 410 in the direction of arrow 436. The piezo 414 detects the edge wave and sends an electrical signal to the controller 418 via electrical connection 438.

The piezo 416 is used for both transmitting and receiving signals. This may be accomplished as discussed previously in connection with FIG. 25 and the controller 368. The piezo 416 is excited by an electrical signal from the signal generator 428 of the controller 418 via electrical connection 440. The piezo 416 launches an edge wave along edge 404 in the direction of arrow 442, which is partially reflected by the reflector elements 424 in the direction of arrow 444 as a SAW. The SAW is reflected 180° by the reflective strip 426 and/or the edge 408 in the direction of arrow 446. The SAW is reflected by the reflector elements 424 and converted to an edge wave propagating in the direction of arrow 448. The edge wave is detected by the piezo 416 and an electrical signal is sent to the controller 418 over the electrical connection 440.

The touch panel 402 utilizes one piezo 416 with reflector elements 424 and the edge 408 (and optionally the reflector strip 426) to detect touch events along the X axis. To detect touch events along the Y axis, the two piezos 412 and 414 and the reflector elements 420 and 422 are used. Therefore, the SAW traverses the touch surface 24 along the X axis only once, while the SAW traverses the touch surface 24 along the Y axis twice.

Figure 27:
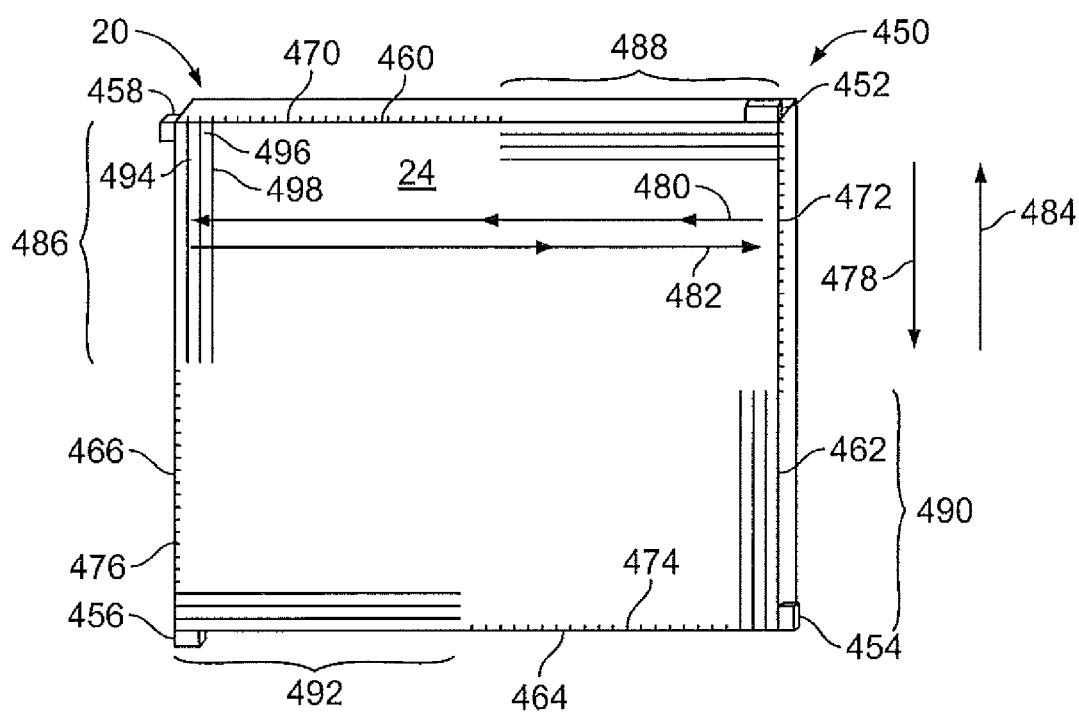
FIG. 27 illustrates a large touch panel comprising four piezos in accordance with an embodiment of the present invention.

FIG. 27 illustrates a large touch panel 450 comprising four piezos 452-458 in accordance with an embodiment of the present invention. The touch panel 450 may comprise a large touch surface 24 on the substrate 20. Therefore, the distance the waves have to travel becomes increasing longer and the signal experiences increased attenuation. For a given touch panel size, the design in FIG. 27 minimizes the maximum path length while having a single transducer at each corner. Note that at most one transducer of the designs in FIGS. 15-18 and 23 can be placed at each corner of the substrate 20.

The piezos 452-458 are mounted at different corners of the substrate 20 and thus do not physically interfere with each other. Each of the piezos 452-458 both transmit and receive signals as discussed previously in FIG. 25, and therefore the controller 418 will not be further discussed.

The substrate 20 is formed having clean edges 460-466. Reflector elements 470-476 are formed proximate each of the edges 460-466 along a length of approximately one-half of each of the edges 460-466 closest to the piezos 452-458. Reflective strips 494-498, if present, may be formed on the touch surface 20 parallel to the edge 466 and spaced apart by a distance of approximately one-half surface acoustic wavelength. The reflective strips 494-498 are formed along approximately one-half of the length of the edge 466 where the reflector elements 476 are not present, or the half of the edge 466 furthest away from the piezo 456. Additional reflective strips are formed on the touch surface 20 parallel to each of the edges 460-464 in the same manner.

When the piezo 452 is excited, the piezo 452 launches an edge wave along the edge 462 in the direction of arrow 478. The edge wave is partially reflected by the reflector elements 472 and converted to a SAW traveling across the touch surface 24 in the direction of arrow 480. The SAW is reflected by 180° in the direction of arrow 482 by the reflective strips 494-498 and/or the edge 466. The SAW is reflected 90° by the reflector elements 472 in the direction of arrow 484 and received by the piezo 452. Therefore, the piezo 452 detects a signal representative of a Y coordinate of one-half of the touch surface 24, such as area 486.

The piezos 454, 456 and 458 each send and receive signals in the manner described for piezo 452, detecting a signal over an area of approximately one-half of the touch surface 24. The piezo 454 detects a signal representative of an X coordinate of an area 488. The piezo 456 detects a signal representative of a Y coordinate of an area 490. The piezo 458 detects a signal representative of an X coordinate of an area 492. Therefore, compared to touch panels that use two piezos to transmit and receive signals, the touch panel 450 uses four piezos 452-458 which receive signals from a signal path reduced in length compared to the two piezo geometry. The edge waves do not have to travel as far and larger touch panels 450 may be implemented. Also, there is no physical interference between piezos 452-458 as each of the piezos 452-458 is mounted on a different corner of the substrate 20.

Figure 32:
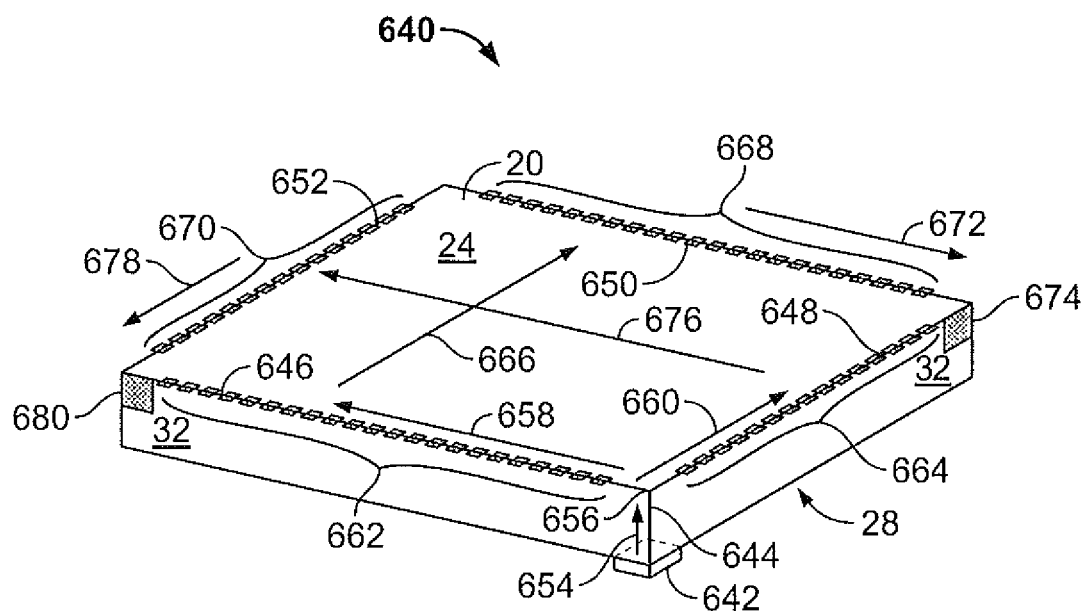
FIG. 32 illustrates a touch sensor wherein a single transmit transducer generates X and Y signals in accordance with an embodiment of the present invention.

FIG. 32 illustrates a touch sensor 640 wherein a single transmit transducer 642 generates X and Y signals in accordance with an embodiment of the present invention. The substrate 20 is formed having clean edges 646-652 as previously discussed. The transmit transducer 642 is mounted on the second surface 28 of the substrate 20 and launches an edge wave in the direction of arrow 654 up a vertical edge 644 which forms the intersection of two sidewalls 32. At a vertex 656 formed of the vertical edge 644 and the two edges 646 and 648, the incident vertically propagating edge wave splits into two horizontally propagating edge waves traveling in the directions of arrows 658 and 660.

The horizontally propagating edge wave traveling in the direction of arrow 658 encounter a transmit reflector array 662 (X direction) which partially scatters the edge wave by 90° and is converted to Rayleigh waves transmitted through the touch surface 24 in the direction of arrow 666. The Rayleigh waves are subsequently received by the X receive reflector array 668, converted to edge waves that are directed in the direction of arrow 672 and received by a transducer 674.

Likewise, the horizontally propagating edge wave traveling in the direction of arrow 660 encounters a transmit reflector array 664, is partially scattered by 90° and converted to Rayleigh waves transmitted through the touch surface 24 in the direction of arrow 676. The Rayleigh waves are received by the Y receive reflector array 670, converted to edge waves that are directed in the direction of arrow 678 and received by a transducer 680. Therefore, the X and Y signals share a common burst (from transducer 642) but have distinct receive signals from distinct receive transducers (674 and 680). Alternatively, the acoustic paths may be reversed so that distinct X and Y transmit transducers may sequentially excite acoustic paths received by a common receiver transducer.

Figure 33:
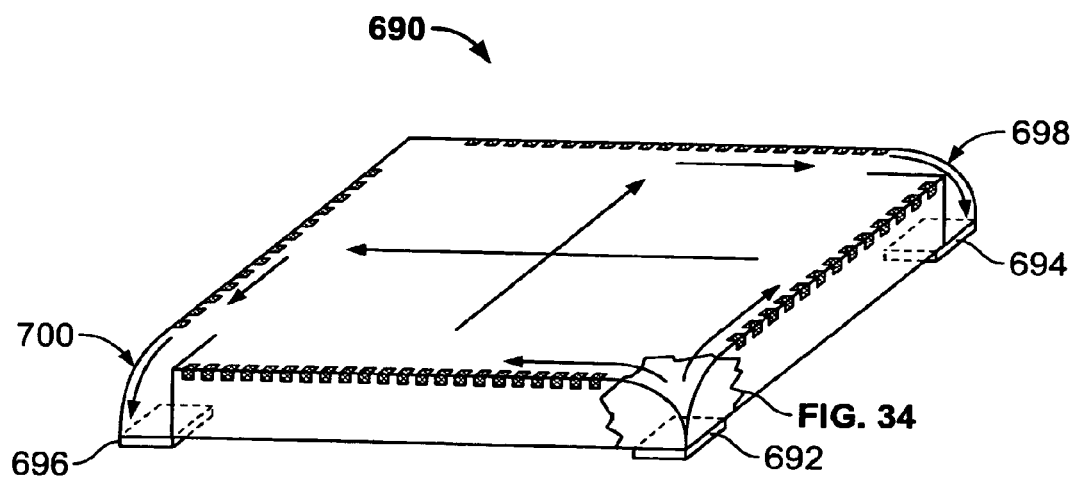
FIG. 33 illustrates an alternative touch sensor wherein a single transmit transducer generates X and Y signals in accordance with an embodiment of the present invention.

FIG. 33 illustrates an alternative touch sensor 690 wherein a single transmit transducer 692 generates X and Y signals in accordance with an embodiment of the present invention. In FIG. 33, the transmit transducer 692 and receive transducers 694 and 696 may be formed and/or attached to the second surface 28 of the substrate 20, allowing increased flexibility when designing a system using the touch sensor 690. Quarter-circle bends 698 and 700 guide the initially horizontal edge-waves into a vertical direction as needed to be received by the transducers 694 and 696 mounted on the bottom surface of the substrate 20.

Figure 34:
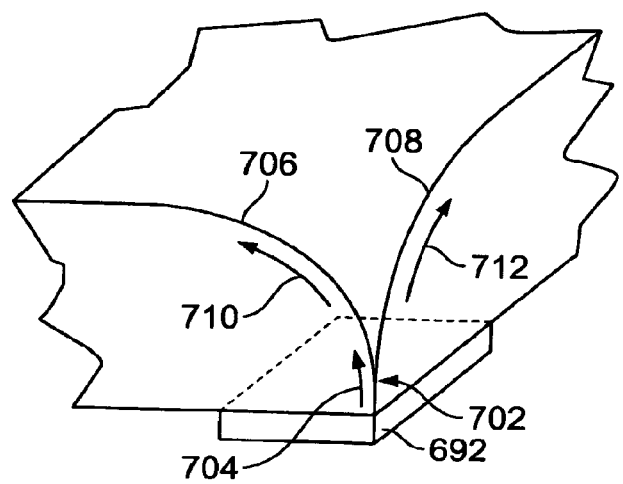
FIG. 34 illustrates a geometry of the substrate near the common transmit transducer in accordance with an embodiment of the present invention.

FIG. 34 illustrates a geometry of the substrate 20 near the common transmit transducer 692 in accordance with an embodiment of the present invention. The transducer 692 launches an edge wave in the direction of arrow 704 up a vertical edge 702. The vertical edge 702 forms two curved edges 706 and 708, and the edge wave splits to form two edges waves propagating in the directions of arrows 710 and 712. Alternatively, the geometry may be the same as illustrated in FIG. 32. Experimental and simulation studies may be used to determine the geometry of the substrate corner that most efficiently splits the transmitted acoustic energy between the X and Y signal paths. As with FIG. 32, the roles of transmit and receive transducers may be swapped in the embodiment of FIGS. 33 and 34.

Figure 28:
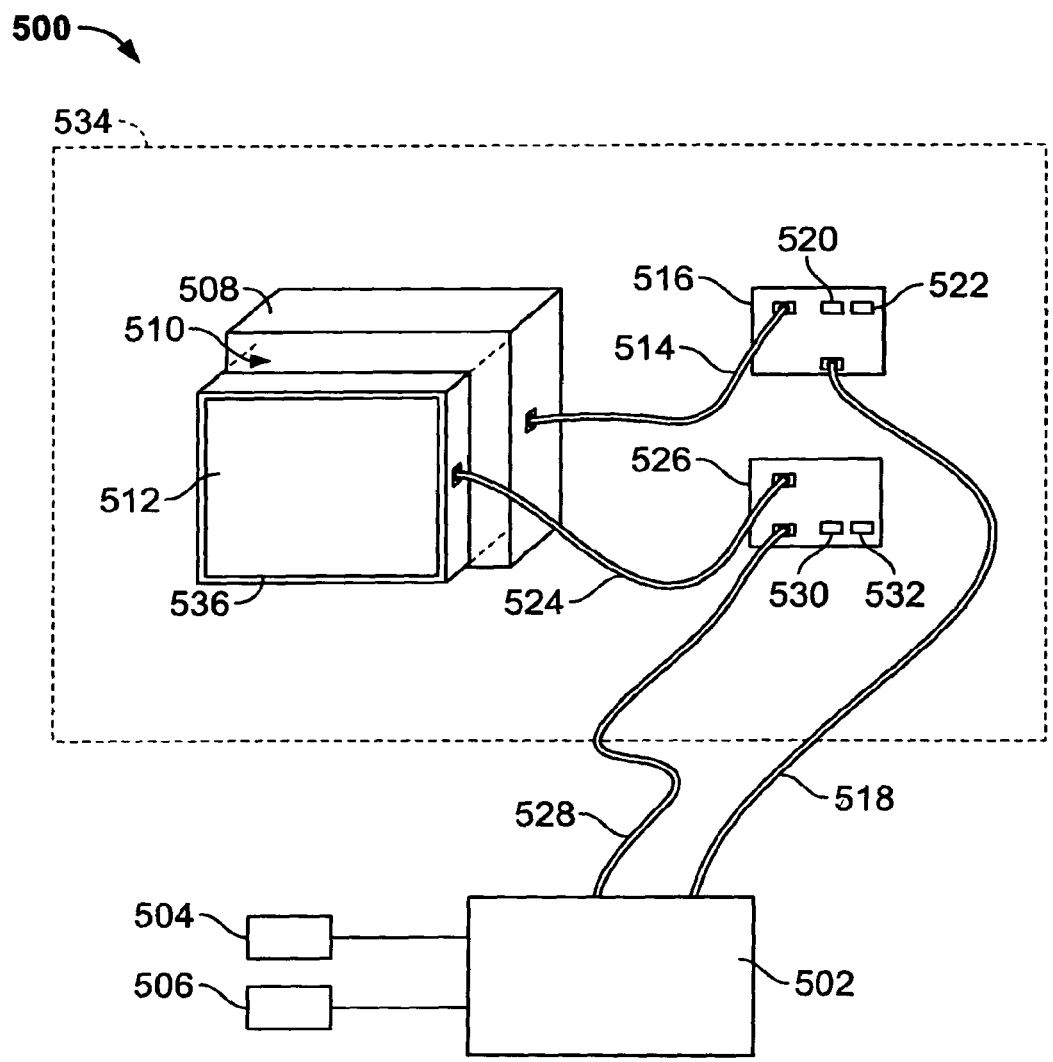
FIG. 28 illustrates a block diagram of a touch monitor interconnected with a computer in accordance with an embodiment of the present invention.

FIG. 28 illustrates a block diagram of a touch monitor 500 interconnected with a computer 502 in accordance with an embodiment of the present invention. The computer 502 runs one or more applications, such as in a factory, a retail store, a restaurant, a medical facility and the like. The computer 502 may be used for calibration and testing in a factory setting, for example, and may comprise a display 504 and a user input 506 such as a keyboard and/or a mouse. Multiple touch monitors 500 may be interconnected with the computer 502 over a network.

A monitor 508 comprises components for displaying data on a display 510. The display 510 may be an LCD, CRT, plasma, photographic image and the like. A touchscreen 512 is installed proximate the display 510. The touchscreen 512 receives input from a user via a finger touch, a stylus, and the like. The touchscreen 512 may be formed of the substrate 20 and have a very narrow border 536. The border 536 may be the width of an edge wave as discussed previously.

A monitor cable 514 connects the monitor 508 with a monitor controller 516. The monitor controller 516 receives video information from the computer 502 over video cable 518. The video information is received and processed by the monitor controller 516, then transferred to the monitor 508 over the monitor cable 514 for display on the display 510. It should be understood that the monitor 508 and the monitor controller 516 may be hardwired together or interconnected such that the monitor cable 514 is not required. The monitor controller 516 comprises components such as a CPU 520 and a memory 522.

A touchscreen cable 524 interconnects the touchscreen 512 with a touchscreen controller 526. The touchscreen controller 526 sends and receives information to and from the computer 502 over touch data cable 528. Touch information is received by the touchscreen 512, transferred over the touchscreen cable 524 to the touchscreen controller 526, and then sent over the touch data cable 528 to the computer 502. The touchscreen controller 526 comprises components such as a CPU 530 and memory 532.

A monitor housing 534 may enclose the monitor 508, the monitor and touchscreen cables 514 and 524, and the monitor and touchscreen controllers 516 and 526. The monitor housing 534 may enclose the border 536 of the touchscreen 512, securing the touchscreen 512 and preventing outside interference with the edge wave, reflectors, transducers, piezos, and the like. For example, it may be desirable to integrate and seal an acoustic touch sensor such the touchscreen 512 to other equipment such as the monitor housing 534. The seal can prevent the ingress of water or other contaminants to the transducers and edge-wave propagating edges, as well as internal components of a touch display system containing the touch sensor. As the border 536, including the transducers for generating and receiving acoustic waves and the reflective arrays for directing the acoustic waves, is narrow, then the total area that must be sealed is reduced when compared to previous monitors having wider borders. Because of the very narrow border 536 made possible by using edge waves, the sealing may be facilitated, for example, by using sealing materials which may be printed or micro-dispensed onto the substrate 20 with controlled registration and narrow seal width. Sealing materials that are heat cured and bonded to the substrate 20 can be used.

By way of example only, the monitor housing 534 may be for a stand alone monitor. Optionally, the monitor housing 534 may be omitted if the touch monitor 500 is installed within a kiosk or other enclosure. The video and touch data cables 518 and 528 may be separate cables or packaged together. The video and touch data cables 518 and 528 extend from the monitor housing 534 to the location of the computer 502.

The memories 522 and 532 store data including Extended Display Identification Data (EDID) data. EDID data may include information about the monitor 508 and touchscreen 512 such as a vender or manufacturer identification number, maximum image size, color characteristics, pre-set timings, and frequency range limits. Optionally, memories 522 and 532 may be combined and provided with one of monitor and touchscreen controllers 516 and 526, to form a single common memory module which stores the EDID for both of the monitor 508 and touchscreen 512. Optionally, the touchscreen and monitor controllers 516 and 526 may be combined to form a single common controller for the touch monitor 500.

Figure 29:
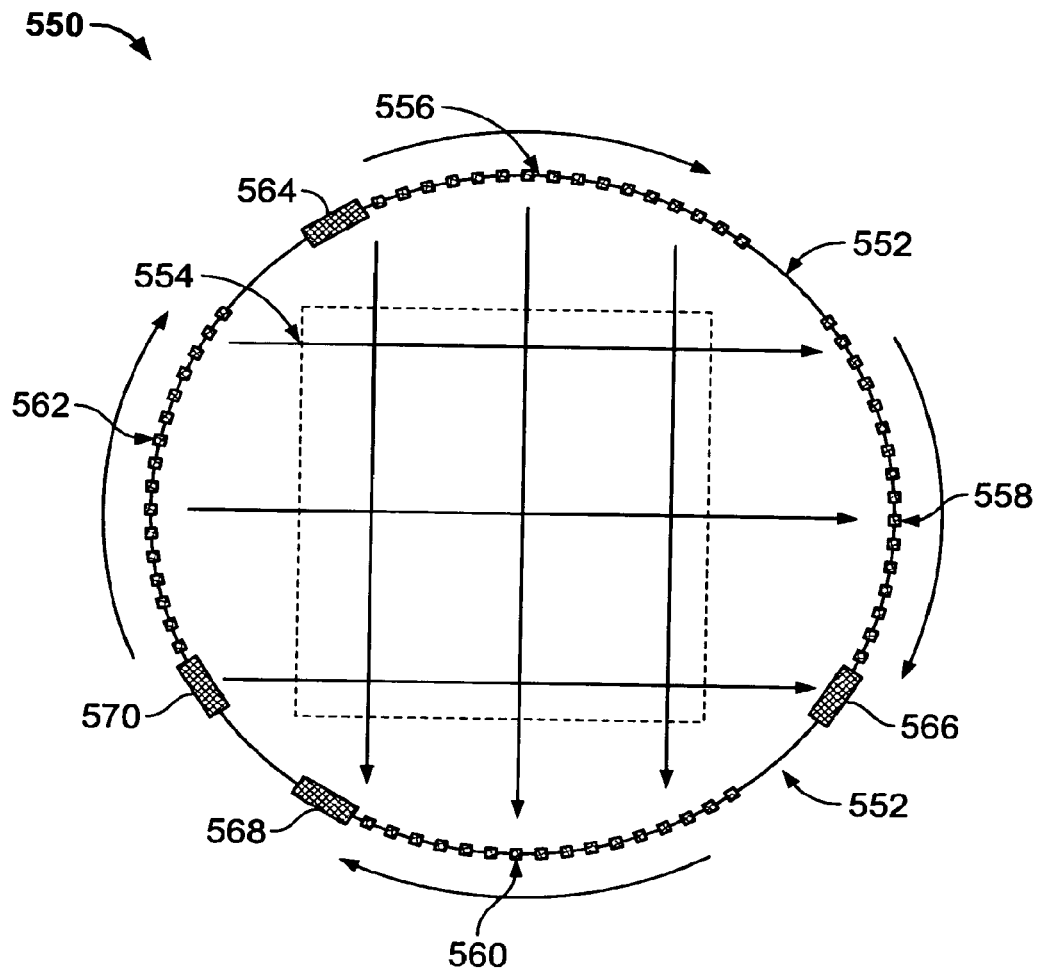
FIG. 29 illustrates an example of a round table top in accordance with an embodiment of the present invention.
Figure 35:
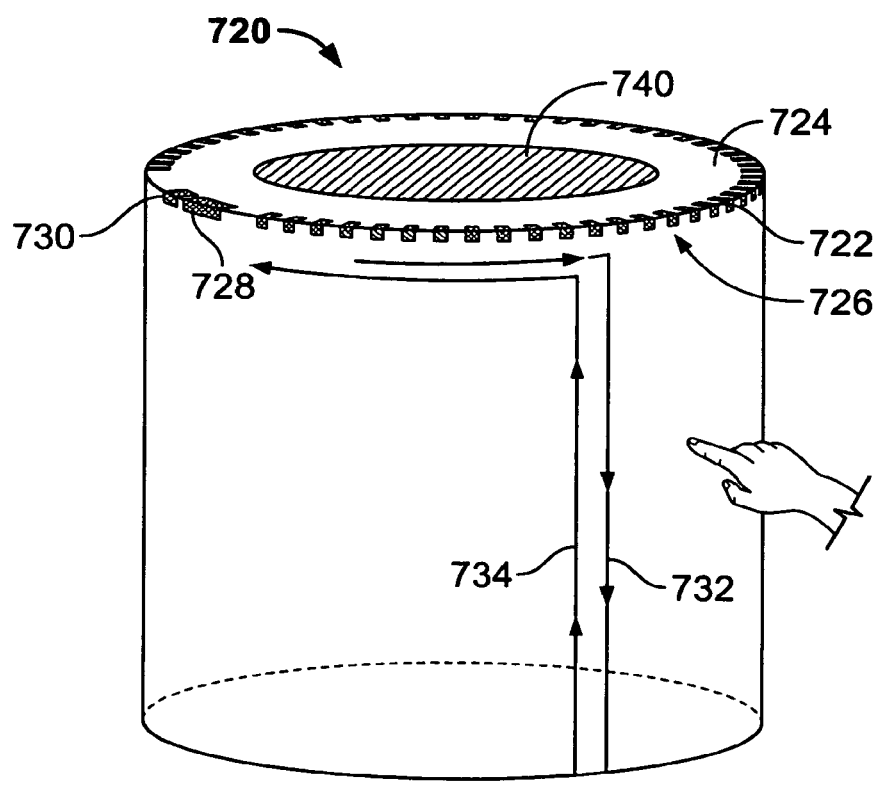
FIG. 35 illustrates an alternative geometrical option in accordance with an embodiment of the present invention.

It should be understood that the touch monitor 500 implementation is only one of many possible implementations of the acoustic touch sensor. For example, a metal, such as aluminum, may be used to form the substrate to create a table accepting touch input. Edge waves travel on curved edges, and thus may be propagated around an edge of a round object, such as a round table top or a cylinder. FIG. 29 illustrates an example of a round table top 550 in accordance with an embodiment of the present invention. The round table top 550 may be made of glass or metal with a clean edge 552 around its perimeter, a square touch area 554, and reflective arrays 556-562 and transducers 564-570 fabricated on the perimeter edge 552 as needed to support the acoustic paths shown. FIG. 35 illustrates an alternative geometrical option in accordance with an embodiment of the present invention. A solid or hollow cylinder 720 has a clean 90° edge 722 with circular geometry on which is fabricated a transmit/receive transducer 728, a reflective array 726, and optionally a edge-wave beam dump, or damper 730. An edge-wave from the transducer 728 is scattered downward by 90° and mode converted to a downward propagating Rayleigh wave in the direction of arrow 732. At the bottom of the cylinder 720 the edge-wave is reflected by 180° in the direction of arrow 734 and the acoustic path retraces its path back to the transducer 728. The damper 740 may be provided to absorb any edge-wave power scattered by the reflective array 726 onto the top horizontal surface 724. Such a sensor provides an angular coordinate of a touch event about the axis of the cylinder 720. (The array design principles of U.S. Pat. No. 5,854,450, incorporated herein by reference, can be also be applied to edge-wave touch sensor designs to enable generalized touch sensor geometries.) Track pads for museum exhibits and other general public applications may also be implemented, wherein substrate 20 is of a robust stainless steel construction of circular or even hemi-spherical geometry. Therefore, the geometry of the acoustic touch sensor is not limited to a square or rectangular flat surface, but may be used to form a large number of different products such as touch sensitive robot surfaces for collision detection. Also, the size of the implementation is not limited, as larger size areas may be detected using a variety of transducer and reflector combinations.

As stated previously, acoustic waves traveling longer acoustic path lengths in a touch sensor or touch sensor system will experience more loss than those traveling shorter acoustic path lengths. Therefore, to make touch sensitivity relatively uniform throughout the touch sensitive region of a touch sensor, it is often desired to effect an equalization of signals resulting from acoustic waves traveling different acoustic path lengths so that signal levels are approximately independent of acoustic path length. Signal equalization may be accomplished, for example, by varying the density of reflector elements along the acoustic paths; the reflector element height or depth along the reflective array; the length of reflector elements; the reflector element length within an array; and the distance between a reflective array and an acoustic beam. In addition, the number of transducers used to transmit and/or receive, and the area of the touch screen each transducer sends and/or receives signals from may be adjusted to account for size and/or shape of the touch object.

It should be understood that the above-described arrangements of apparatus and method are merely illustrative, and that other embodiments and modifications may be made without departing from the spirit and scope of the claims.

What is claimed is:

1. A shear-mode transducer for generating or receiving an acoustic edge wave in a touch sensor having a substrate with a first surface having a touch region and a second surface intersecting the first surface along a first edge, the acoustic edge wave propagating along the first edge, the shear-mode transducer mounted on the substrate on the second surface, the shear-mode transducer comprising:
    a shear-mode piezoelectric element, the shear-mode piezoelectric element generating shear motion in a direction relative to a plane of the second surface defined by X and Y axes so as to couple to the acoustic edge wave, wherein the shear motion is polarized diagonally in the plane of the second surface defined by the x and y axes; and
    a first electrode and a second electrode disposed on the shear-mode piezoelectric element to provide an active region of the shear-mode piezoelectric element, said active region comprising a cross-sectional area of the acoustic edge wave.

2. The shear-mode transducer of claim 1, wherein the second surface comprises a second sidewall of the substrate, wherein the second sidewall is perpendicular to a propagation direction of the acoustic edge wave.

3. The shear-mode transducer of claim 1, wherein the shear-mode piezoelectric element has been poled to provide the shear motion in the direction comprising an approximately 45 degree in the plane.

4. The shear-mode transducer of claim 3, the shear-mode piezoelectric element comprising a front and a back surface, the first electrode covering a portion of the front surface, the second electrode covering a substantial part of the back and front surfaces, the active region corresponding to an area of the shear-mode piezoelectric element where the first and second electrodes overlap.

5. The shear-mode transducer of claim 4, the first and second electrodes on the front surface of the shear-mode piezoelectric element configured for receiving attachments to first and second electrical connections for exciting the shear-mode piezoelectric element, wherein the front surface is covered by the first and second electrodes which are separate.

6. The shear-mode transducer of claim 4, the shear-mode piezoelectric element being mounted to the substrate having an overhang portion of the shear-mode piezoelectric element extending beyond at least one of the first surface and the second surface by a distance of less than one wavelength of the acoustic edge wave.

7. The shear-mode transducer of claim 4, wherein the second electrode wraps around the shear-mode piezoelectric element from the front surface to the back surface.

8. The shear-mode transducer of claim 1, the shear-mode transducer being bonded to the substrate, the bonding corresponding to a portion of the active region and providing strong acoustic coupling between the substrate.

9. The shear-mode transducer of claim 1, wherein the active region has a size less than one-wavelength squared of the acoustic edge wave.

10. The shear-mode transducer of claim 1, the shear-mode piezoelectric element comprising front and back surfaces, a depth, a first side; a second side; the first side and second side not intersecting but being joined by a notched corner, the notched corner also intersecting each of the front and back surfaces, the shear-mode piezoelectric element being poled in a direction perpendicular to the plane; and first and second electrodes formed on first and second edges, the first and second electrodes receiving attachments to first and second electrical contacts for exciting the piezoelectric element.

11. The shear-mode transducer of claim 10 wherein the depth comprises one-half of a bulk shear wave wavelength.

12. The shear-mode transducer of claim 11, the shear-mode piezoelectric element being mounted to the substrate having an overhang portion of the shear-mode piezoelectric element extending beyond at least one of the first surface and the second surface by a distance of less than one wavelength of the acoustic edge wave.

13. The shear-mode transducer of claim 10 wherein the notched corner has an angle of approximately 45 degrees with respect to the first and second sides.

14. The shear-mode transducer of claim 13, the shear-mode piezoelectric element being mounted to the substrate having an overhang portion of the shear-mode piezoelectric element extending beyond at least one of the first surface and the second surface by a distance of less than one wavelength of the acoustic edge wave.

15. The shear-mode transducer of claim 10, the shear-mode piezoelectric element being mounted to the substrate having an overhang portion of the shear-mode piezoelectric element extending beyond at least one of the first surface and the second surface by a distance of less than one wavelength of the acoustic edge wave.

16. The shear-mode transducer of claim 1, the shear-mode piezoelectric element being mounted to the substrate having an overhang portion of the shear-mode piezoelectric element extending beyond at least one of the first surface and the second surface by a distance of less than one wavelength of the acoustic edge wave.

* * * * *